(12) United States Patent
Tanaka

(10) Patent No.: US 8,529,142 B2
(45) Date of Patent: Sep. 10, 2013

(54) RFID CIRCUIT ELEMENT CARTRIDGE, ROLL FOR PRODUCING ELECTROMAGNETIC RADIATION REACTION ELEMENT LABEL, AND TAG-LABEL PRODUCING DEVICE

(75) Inventor: Mitsugi Tanaka, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 2099 days.

(21) Appl. No.: 11/539,956

(22) Filed: Oct. 10, 2006

(65) Prior Publication Data

US 2007/0084548 A1    Apr. 19, 2007

Related U.S. Application Data

(63) Continuation-in-part of application No. PCT/JP2005/005977, filed on Mar. 29, 2005.

(30) Foreign Application Priority Data

Apr. 12, 2004 (JP) ................................. 2004-116676
May 28, 2004 (JP) ................................. 2004-158543

(51) Int. Cl.
*B41J 3/36* (2006.01)
*B41J 15/04* (2006.01)
*B41J 25/304* (2006.01)

(52) U.S. Cl.
CPC .............. *B41J 15/044* (2013.01); *B41J 25/304* (2013.01)

USPC ......... 400/88; 400/120.17; 400/613; 347/198

(58) Field of Classification Search
CPC ...................................................... B41J 15/044
USPC .............. 400/208, 613, 88, 120.17; 347/198
See application file for complete search history.

(56) References Cited

U.S. PATENT DOCUMENTS

| 5,597,247 | A |   | 1/1997 | Inakoshi et al. |
| 5,653,542 | A | * | 8/1997 | Sugimoto et al. ............. 400/248 |
| 5,882,126 | A | * | 3/1999 | Bowling ........................ 400/55 |

(Continued)

FOREIGN PATENT DOCUMENTS

| JP | 1995314831 A | 12/1995 |
| JP | H08-058203 A | 3/1996 |

(Continued)

OTHER PUBLICATIONS

International Search Report (International Patent Application No. PCT/JP2005/005977) mailed Jun. 7, 2005.

(Continued)

*Primary Examiner* — Daniel J Colilla
(74) *Attorney, Agent, or Firm* — Baker Botts L.L.P.

(57) ABSTRACT

A cartridge includes a tag tape roll around which a tag tape is wound, said tag tape having a plurality of RFID circuit elements aligned in a safety area, which is located at an end on one side in the width direction of said tag tape, and including a print area on the other side in the width direction with respect to said RFID circuit elements. A tag label producing device performs predetermined printing on said print area by a print head while paying out said tag tape from said tag tape roll, and produces a tag label by using said tag tape on which printing has been performed.

1 Claim, 26 Drawing Sheets

(56) References Cited

U.S. PATENT DOCUMENTS

| | | | |
|---|---|---|---|
| 6,042,280 A | 3/2000 | Yamaguchi et al. | |
| 6,116,796 A | 9/2000 | Yamaguchi et al. | |
| 6,485,206 B1 * | 11/2002 | Takahashi | 400/207 |
| 6,901,682 B2 | 6/2005 | Igaki et al. | |
| 2001/0012645 A1 | 8/2001 | Usami | |
| 2002/0031388 A1 * | 3/2002 | Palmer et al. | 400/615.2 |
| 2002/0195194 A1 | 12/2002 | Grabau et al. | |
| 2002/0195195 A1 | 12/2002 | Grabau et al. | |
| 2004/0062586 A1 * | 4/2004 | Harada et al. | 400/191 |

FOREIGN PATENT DOCUMENTS

| | | |
|---|---|---|
| JP | H08-096090 A | 4/1996 |
| JP | H11-078322 A | 3/1999 |
| JP | H11-085923 A | 3/1999 |
| JP | 2000-189650 A | 7/2000 |
| JP | 2000-251098 A | 9/2000 |
| JP | 2000-321984 A | 11/2000 |
| JP | 2001-217380 A | 8/2001 |
| JP | 2001-331768 A | 11/2001 |
| JP | 2002-002154 A | 1/2002 |
| JP | 2002-337434 A | 11/2002 |
| JP | 2002-340624 A | 11/2002 |
| JP | 2003-067715 A | 3/2003 |
| JP | 2003-157419 A | 5/2003 |
| JP | 2003-168099 A | 6/2003 |
| JP | 2003-331244 A | 11/2003 |
| JP | 2004-082348 A | 3/2004 |
| JP | 2004-082432 A | 3/2004 |
| JP | 2004-118625 A | 4/2004 |
| WO | 0161646 A1 | 8/2001 |

OTHER PUBLICATIONS

Japan Patent Office, Notice of Reasons for Rejection for Japanese Patent Application No. 2004-116676 (counterpart to above-captioned patent application), mailed Feb. 24, 2011.

Japanese Patent Office, Notice of Reason for Rejection for Application No. JP2004-116676, mailed Aug. 23, 2010. (Counterpart to above-captioned U.S. patent application.).

Japanese Patent Office, Notice of Reason for Rejection for Application No. JP2004-158543, mailed Aug. 23, 2010 (Counterpart to above-captioned U.S. patent application.).

Japan Patent Office; Notice of Reasons for Rejection in Japanese Patent Application No. 2004-116676 (counterpart to the above-captioned U.S. patent application) mailed Apr. 7, 2010.

Japan Patent Office; Notice of Reasons for Rejection in Japanese Patent Application No. 2004-158543 (counterpart to the above-captioned U.S. patent application) mailed Apr. 7, 2010.

International Bureau of WIPO, International Preliminary Report on Patentability, Related Patent Application No. PCT/JP2005/005977 mailed Oct. 26, 2006.

* cited by examiner

FIG.23

| PRINT CHARACTER | R F - I D |
| --- | --- |
| ACCESS ID | 1 6 , 7 7 7 , 2 1 5 |
| ARTICLE INFORMATION | 1 3 1 , 0 7 1 |
| SERVER INFORMATION | 2 , 0 9 7 , 1 5 1 |

BY ARRANGING IC CIRCUIT PART ON INNER PERIPHERAL SIDE AT TIME OF DEFLECTION, FORCE FOR STRIPPING OFF IC CIRCUIT PART FROM ANTENNA IS NOT GENERATED.

SINCE IC CIRCUIT PART HAS HIGHER RIGIDITY, IT CANNOT FOLLOW UP ANTENNA, SO JOINING PART IS DAMAGED AND FORCE IS GENERATED IN DIRECTION FOR STRIPPING IC CIRCUIT PART FROM ANTENNA (ARROWED PORTION)

RFID CIRCUIT ELEMENT CARTRIDGE, ROLL FOR PRODUCING ELECTROMAGNETIC RADIATION REACTION ELEMENT LABEL, AND TAG-LABEL PRODUCING DEVICE

CROSS-REFERENCE TO RELATED APPLICATION

This is a CIP application PCT/JP2005/5977, filed Mar. 29, 2005, which was not published under PCT article 21(2) in English.

BACKGROUND OF THE INVENTION

1. Field of the Invention

The present invention relates to a roll for producing an electromagnetic radiation reaction element label for producing an electromagnetic radiation reaction element label in a continuous tape-like form, a tag-label producing device as the electromagnetic radiation reaction element label producing device, and a RFID circuit element cartridge using the tag-label producing device.

2. Description of the Related Art

Conventionally, there has already been proposed a tape printing device (label producing device) which has a tape serving as a print-receiving material accommodated in a roll within a cartridge (cassette) and is adapted to print desired characters onto the tape as it is paid out from the roll and discharge the tape in the form of a label (see, for example, Patent Document 1).

In this related art, the tape printing device includes a roll having a base tape (adhesive tape) wound thereon, and a roll having wound thereon a print-receiving tape (film tape) that is bonded onto the base tape. The tape printing device is adapted to perform, while paying out the base tape and the print-receiving tape from these two rolls, predetermined printing on the print-receiving tape being fed, and bond the print-receiving tape on which printing has been performed and the base tape together to thereby produce a label.

On the other hand, a system for performing reading/writing of information in a non-contact manner between a small tag equipped with an electromagnetic radiation reaction element and a reader (reading device)/writer (writing device) is conventionally known. The system allows the reader/writer to make access (reading/writing of information) to the electromagnetic radiation reaction element equipped to the tag even when the tag is soiled or arranged at a position where it cannot be seen. In recent years, in particular, increasing attention has been focused on RFID (Radio Frequency Identification) systems equipped with a RFID circuit element. A RFID circuit element provided in a RFID tag is equipped with an IC circuit part for storing predetermined RFID tag information, and an antenna connected to this IC circuit part to transmit/receive information. Since the reader/writer can make access (reading/writing of information) to the RFID tag information of the IC circuit part even in such a case where the RFID tag is soiled or the RFID tag is arranged at a position where it cannot be seen, the practical use of RFID systems is being anticipated for a variety of fields such as merchandise management and inspection processes.

Here, if, separately from the tag information stored in the tag, information associated with the RFID tag information is printed on a label, and this label is bonded together with the tag for use, the above-mentioned associated information can be viewed from the user side, which may prove convenient in many situations. In view of this, a method has been conceived in which, by applying the above-mentioned related art, the electromagnetic radiation reaction element is arranged on the base tape side or on the print-receiving tape side to produce a print tape incorporating the electromagnetic radiation reaction element, thereby producing the tag label. As the construction of the tag label, one shown in, for example, Patent Document 2 is known.

In this related art, two antennas are provided on both sides of one IC circuit part (IC label), and the two antennas are each connected to the IC circuit part. Further, a structure composed of the two antennas and the IC circuit part is mounted onto a base made of paper, a plastic film, or the like. According to a construction for producing such a tag label, there are provided a label affixing device and a cutting device. The label affixing device includes an antenna medium supplying device including a roll that consists of a sheet having an antenna on the top surface wound in a roll form, and a roll having wound thereon a tape base having IC circuit parts arranged at a fixed interval, and affixes the IC circuit parts stripped off from the tape base onto the antenna of the sheet that is rolled out from the antenna medium supplying device and intermittently supplied along a feed path to thereby produce RFID circuit elements. The cutting device cuts the sheet, on which the RFID circuit elements have been formed at a fixed interval due to this affixing process, into each individual RFID circuit element to thereby form a RFID label.

Patent Publication 1: JP,A,07-314831 (FIGS. 1 and 2)
Patent Publication 2: JP,A,2003-168099 (paragraphs 0008 to 0059, FIGS. 1 to 7)

However, the above-mentioned related art techniques involve the following problems.

That is, there are cases where, for reasons such as clearly indicating that an electromagnetic radiation reaction element is incorporated in the tag label when producing the tag label, the electromagnetic radiation reaction element is arranged not on the base tape side but on the print-receiving tape side. In this case, when the construction described in Patent Document 1 mentioned above is applied to the production of a tag label, the portion of the print-receiving tape where the electromagnetic radiation reaction element is provided becomes uneven in configuration. Accordingly, when printing is performed during the feeding as described above, an external force (larger than that applied to the other regular shaped portion) is applied to the uneven shaped portion. As a result, printing may no longer be performed in a satisfactory manner or the resulting print may become hard to see, making it difficult to ensure the soundness of the tag label product.

On the other hand, in the tag-label production device according to the related art technique described in Patent Document 2, the roll (the roll around which the sheet including the antenna medium is wound) equipped in the antenna medium supplying device, and the roll (the roll around which the tape base including the IC label is wound) equipped in the label affixing device are consumables that wear and tear with use and hence require replacement. Accordingly, in order to enable easy and simple replacement of these consumables, a method may be conceived in which, as in Patent Document 1 mentioned above, these rolls are integrated into a cartridge, and the cartridge as a whole is replaced when there is no more roll available.

In this case, however, to feed the RFID circuit element, which is produced by affixing the IC circuit part and the antenna together, in the narrow confined space within the cartridge, it may often be necessary to largely change the feed direction by means of, for example, a roll or the like (=deflection). Here, usually, the IC circuit part having a relatively small size exhibits a rigidity greater than that of the antenna having a relatively large size; in the case where, for example, the antenna is located on the radially inner peripheral side and the IC circuit part is located on the radially outer peripheral side at the time of the above-mentioned deflection, although it is relatively easy for the antenna to follow and deflect along the shape of the roller or the like, it is generally rather difficult for the IC circuit part to follow and deflect along the shape of the roller or the like. As a result, a force acting to strip off the IC circuit part from the antenna is generated at the time of the above-mentioned deflection, which reduces the soundness and reliability of the completed tag label product.

SUMMARY OF THE INVENTION

A first object of the present invention is to provide a RFID circuit element cartridge, a roll for producing an electromagnetic radiation reaction element label, and a tag-label producing device, which can improve the soundness of the tag label product.

A second object of the present invention is to provide a roll for producing an electromagnetic radiation reaction element label, a RFID circuit element cartridge, and a tag-label producing device, which allow printing to be performed in a satisfactory manner even with respect to a tape member in which electromagnetic radiation reaction elements such as RFID circuit elements are arranged.

A third object of the present invention is to provide a RFID circuit element cartridge which can prevent a force acting to strip off the IC circuit part from the antenna from being generated to thereby improve the soundness and reliability of the tag label, and a tag-label producing device using the RFID circuit element cartridge.

BRIEF DESCRIPTION OF THE DRAWING

FIG. 23 is a diagram showing an example of the screen displayed on a terminal or a general purpose computer at the time of making access to RFID tag information.

DETAILED DESCRIPTION OF THE PREFERRED EMBODIMENTS

Embodiments of the present invention will now be described with reference to the drawings.

A first embodiment of the present invention will be described with reference to FIGS. 1 to 17.

Figure 1:
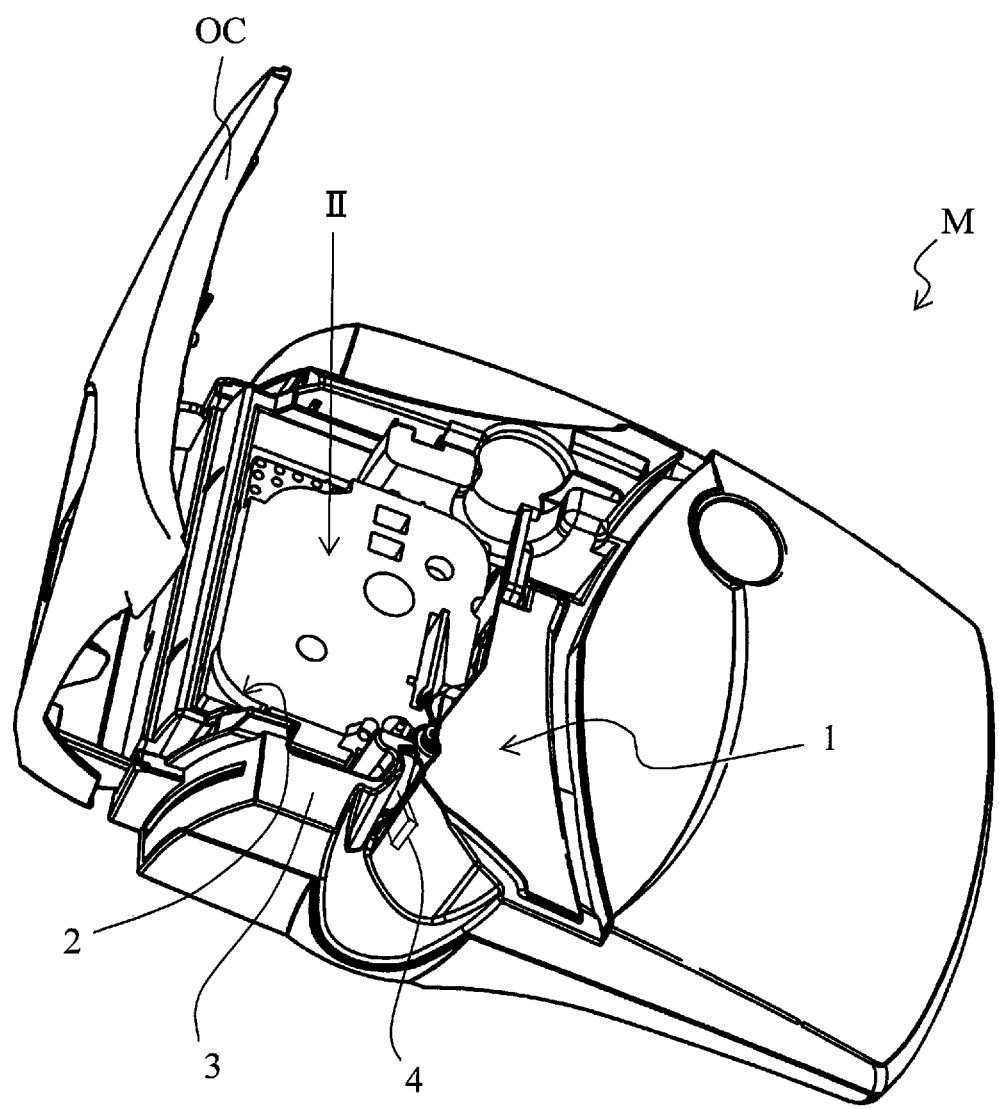
FIG. 1 is a perspective view showing the general overall structure of a tag-label producing device according to a first embodiment of the present invention.

FIG. 1 is a perspective view showing the general overall structure of a tag-label producing device (in the state where a cartridge 100 that will be described later is mounted and an open/close cover OC is opened) according to this embodiment.

In FIG. 1, a tag-label producing device (tape producing device) M includes a main body 1, a cartridge holder part 2 for accommodating the cartridge (RFID circuit element cartridge) 100 detachably mounted to the main body 1, a housing 3 forming the outer shell of the main body 1, an antenna 4 for performing exchange of signals through wireless communication using a radio frequency in the UHF band or the like, and the open/close cover OC pivotably connected to the main body 1 so as to cover the cartridge holder part 2 when closed.

Figure 2:
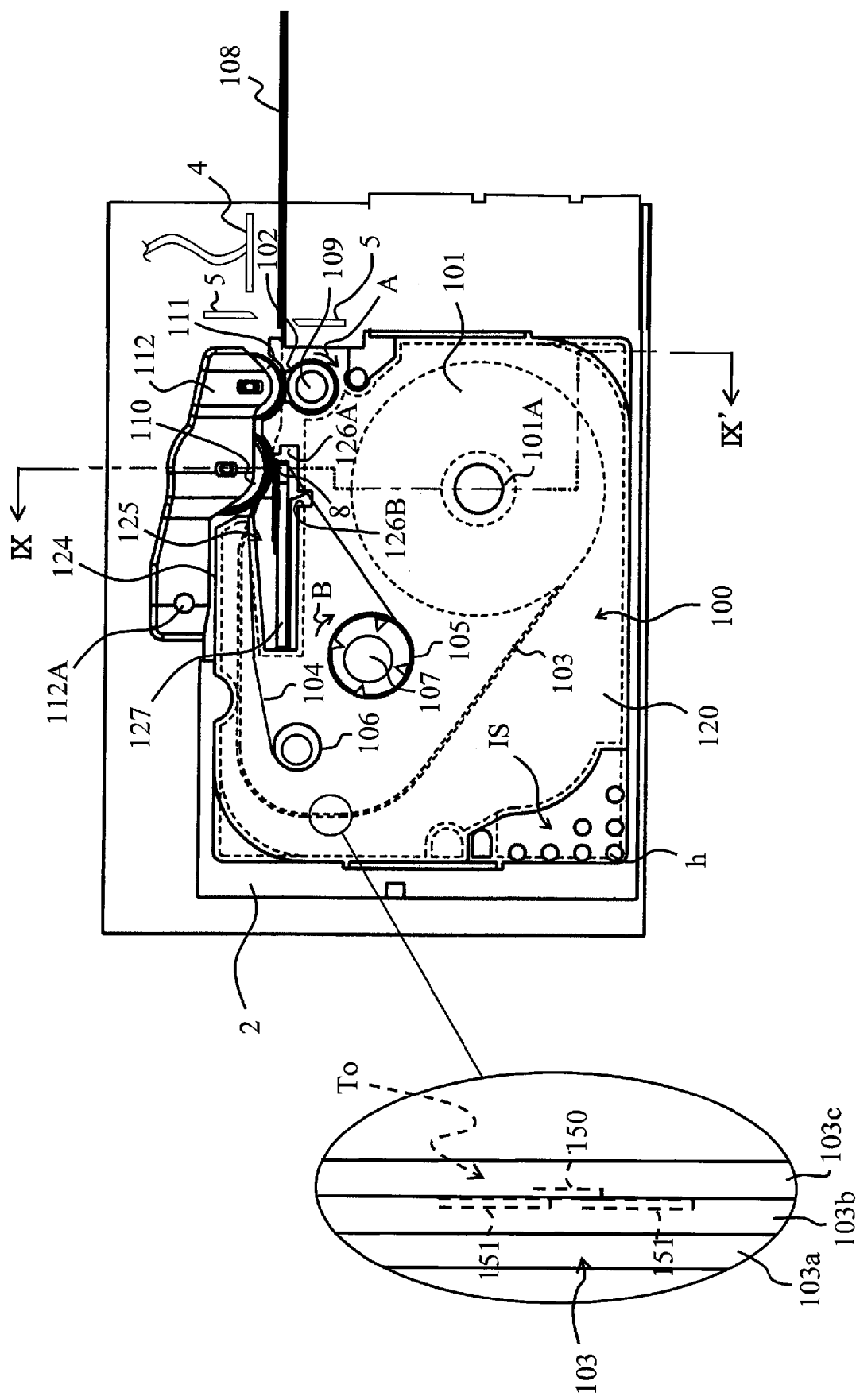
FIG. 2 is a partially see-through top view as seen from the direction II of FIG. 1.

FIG. 2 is a (partially see-through) top view showing, together with the cartridge 100, the portion of the main body 1 in the vicinity of the cartridge 100, as seen from the direction II in FIG. 1.

In FIG. 2, the cartridge 100 is fitted in the cartridge holder part 2 in the form of a recess within the housing 3. The cartridge 100 has a tag tape roll 101 around which a tag tape 103 is wound, a ribbon-supply-side roll 106 for paying out a printing ink ribbon 104, a ribbon take-up roller 105 on which the ink ribbon 104 after printing is taken up, and a tape feed roller 102 for feeding the tag tape roll 101 to the outside of the cartridge 100.

The tag tape roll 101 has the tag tape 103 around a reel member 101A. The tag tape 103 is in the form of a transparent band-like tape with a plurality of the RFID circuit elements To successively formed in the longitudinal direction thereof.

The tag tape 103 to be wound around the tag tape roll 101 is of a three-layer structure in this example (see the partially enlarged view in FIG. 2). The tag tape 103 includes, from the side wound on the outer side (the left side in FIG. 2) to the side opposite thereto (the right side in FIG. 2), a separation sheet 103a, an adhesive layer 103b, and a cover film (print-receiving layer) 103c formed of PET (polyethylene terephthalate) or the like that are laminated in the stated order.

An IC circuit part 150 for storing information is integrally provided on the back side (the left side in FIG. 2) of the cover film 103c. An antenna 151 connected to the IC circuit part 150 to perform transmission/reception of information is formed on the surface on the back side of the cover film 103c. The IC circuit part 150 and the antenna 151 constitute the RFID circuit element To. On the back side (the left side in FIG. 2) of the cover film 103c, the separation sheet 103a is adhered onto the cover film 103c by means of the adhesive layer 103b. The separation sheet 103a is peeled off when affixing the finally completed RFID label T onto a predetermined item or the like, thus allowing adhesion of the RFID label T onto the item or the like by means of the adhesive layer 103b.

Further, in a case 120 of the cartridge 100, a portion to be detected IS is formed at the corner on the side opposite to the tape feed roller 102. The portion to be detected IS includes a plurality of switch holes h formed in predetermined patterns. Each pattern indicates the kind of the cartridge 100 as specified by parameter information, for example, the optimum communication parameters (the frequency of the electromagnetic wave used for wireless communication, the communication protocols, and the like) for the RFID circuit element To within the cartridge 100, tag attribute parameters (the sensitivity of the antenna 151 of the RFID circuit element To, the memory capacity of the IC circuit part 150, the width of the tape 103 onto which the element To are affixed, the arranging interval of the elements To on the tape 103, and the like), and the like. This pattern, which differs in accordance with the kind of each cartridge 100, is detected by a plurality of cartridge sensors (or cartridge detecting switches) 132 (detection means; see FIG. 15 that will be described later) disposed on the main body 1 side.

On the other hand, the cartridge holder part 2 of the tag-label producing device M mentioned above is equipped with a print head (thermal head) 8 for performing predetermined printing on the tag tape 103 paid out from the tag taper roll 101, a ribbon take-up roller drive shaft 107 for driving the ribbon take-up roller 105 on which the ink ribbon 104 that has finished printing onto the tag tape 103 is taken up, a tape-feed-roller drive shaft 109 for driving the tape feed roller 102, and a roller holder 112 arranged at a position opposed to the print head 8 so as to be capable of being brought into and out of contact with the print head 8, the roller holder 112 holding a platen roller 110 and a sub-roller 111.

When the cartridge 90 is loaded onto the cartridge holder part 2 of the above-mentioned tag-label producing device M, the roller holder 112 is moved from a separated position to an abutting position, whereby the tag tape 103 and the ink ribbon 104 are held between the print head 8 and the platen roller 110, and also the tag tape 103 is held between the tape feed roller 102 and the sub-roller 111. The tape-feed-roller drive shaft 109, and the sub-roller 111 and the platen roller 110 are coupled together by gears; the tape feed roller 102, the sub-roller 111, and the platen roller 110 are adapted to rotate as the tape-feed-roller drive shaft 109 is driven. Further, as for the tag tape 103 rolled out from the second roll 102, the ink ribbon 104 driven by the ribbon-supply-side roll 106 and the ribbon take-up roller 105 mentioned above, which are arranged on the front surface side thereof, is brought into contact with the surface of the tag tape 103 by being pressed against the print head 8.

In the above-described construction, the tape feed roller 102 and the ribbon take-up roller 105 are synchronously rotated on their axes in the directions respectively indicated by the arrows A and B by the drive force of a motor 203 to drive cartridge shaft (described later). The tag tape 103 is paid out from the tag tape roll 101 due to this drive force. At the same time with this, a plurality of heater elements of the print head 8 are energized by a print-head drive circuit 205 (described later). As a result, a print R such as a predetermined character, sign, or barcode is printed on the back surface of the tag tape 103, thus forming a tag label tape 108 with print, which is carried to the outside of the cartridge 100. The ink ribbon 104 for which printing onto the tag tape 103 has finished is taken up on the ribbon take-up roller 105 through the drive of the ribbon take-up roller drive shaft 107.

Figure 3:
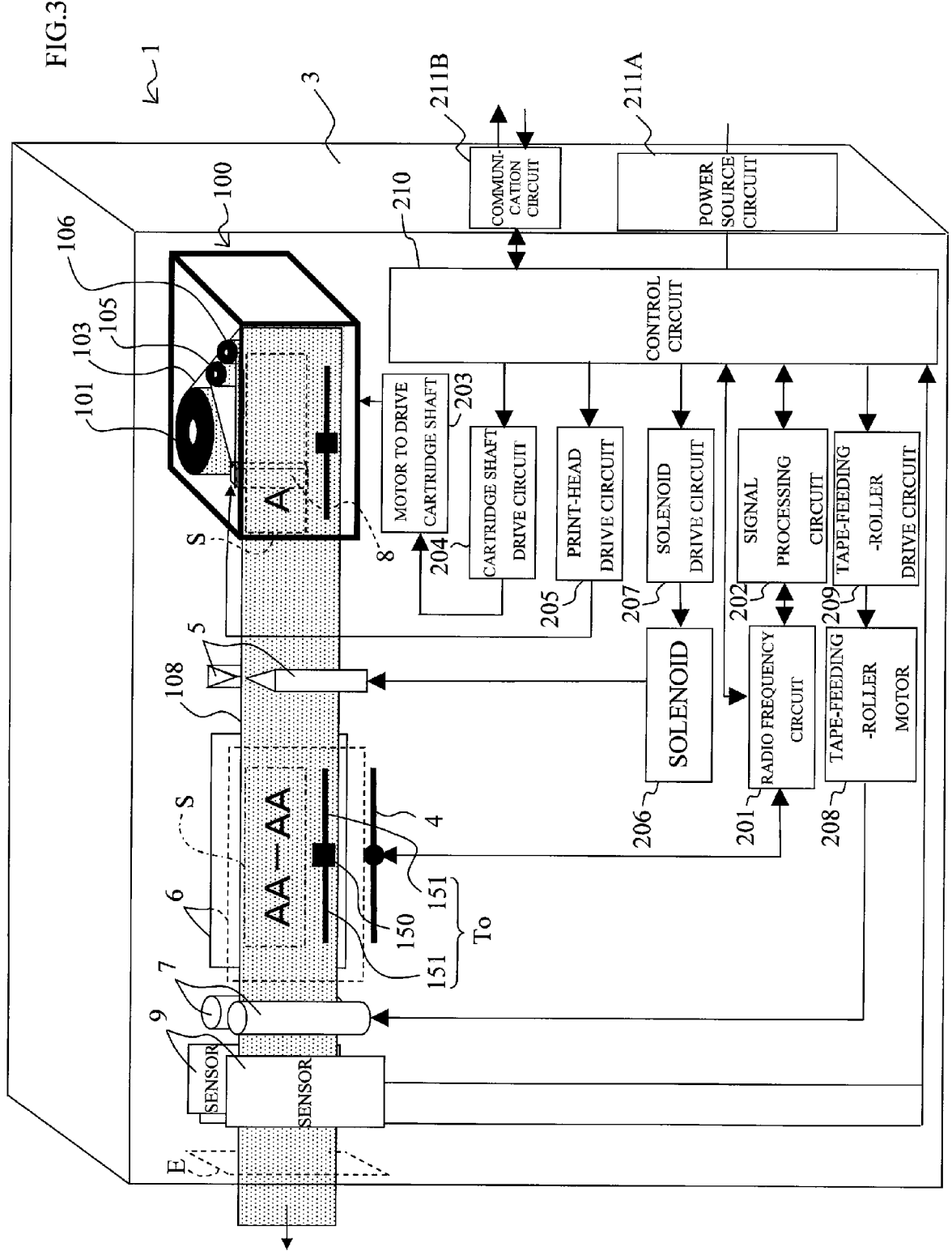
FIG. 3 is a conceptual diagram showing the details of a main body in the state with a cartridge mounted.

FIG. 3 is a conceptual diagram showing the details of the main body 1 with the cartridge 100 being mounted.

In FIG. 3, in the tag tape 103 wound around the tag tape roll 101, the plurality of RFID circuit elements To are aligned at an end on one side (the lower side in FIG. 3) in the width direction of the tag tape 103, and the other side (the upper side in FIG. 3) in the width direction of each RFID circuit element To serves as a print area S where printing corresponding to each RFID circuit element To is performed by the print head 8.

Further, in addition to the above-described components, the main body 1 includes: the antenna 4 for performing exchange of signals with the RFID circuit elements To equipped in the tag label tape 108 with print, through wireless communication using a radio frequency of the UHF band or the like; a cutter 5 for cutting the tag label tape 108 with print at a predetermine timing into a predetermined length to thereby produce a label-shaped RFID label T (described later); a pair of feeding guides 6 for setting and holding the RFID circuit elements To within a predetermined access area opposed to the antenna 4 at the time of the signal exchange through wireless communication, and for guiding each RFID label T that has been cut; a feeding roller 7 for carrying and feeding the thus guided RFID label to a carrying-out exit E; a sensor 9 for detecting the presence/absence of the RFID label T at the carrying-out exit E; a radio frequency circuit 201 for accessing (for reading from or writing to) information (RFID tag information) of the IC circuit part 150 of the RFID circuit element To via the antenna 4; a signal processing circuit 202 for reading information by processing a signal read out from the IC circuit part 150 of the RFID circuit element To, and for accessing the IC circuit part 150 of the RFID circuit element To; a cartridge shaft drive circuit 204 for controlling the drive of the motor 203 to drive cartridge shaft; the print-head drive circuit 205 for controlling the supply of electric power to the print head 8; a solenoid 206 for driving the cutter 5 so as to perform the cutting operation; a solenoid drive circuit 207 for controlling the solenoid 206; a tape-feeding-roller drive circuit 209 for controlling a tape-feeding-roller motor 208 that drives the tape feeding roller; and a control circuit 210 for controlling the operation of the tag-label producing device M as a whole via the radio frequency circuit 201, the cartridge shaft drive circuit 204, the print-head drive circuit 205, the solenoid drive circuit 207, the tape-feeding-roller drive circuit 209, and the like.

The cutter 5 is provided near the exit of the cartridge 100. The cutter 5 cuts the tag label tape 108 with print, which has been carried out from the cartridge 100 and for which reading/writing of RFID tag information with respect to the IC circuit part 150 of the RFID circuit element To has been completed, at a predetermined timing into a predetermined length, thereby splitting the tag label tape 108 with print into individual RFID tags (tag labels) T with the RFID circuit element To.

The control circuit 210 is a so-called microcomputer; although detailed description is omitted, the control circuit 210 is composed of a CPU as a central processing unit, a ROM, a RAM, and the like, and adapted to perform signal processing in accordance with a program previously stored in the ROM while utilizing the temporary memory function of the RAM. Further, the control circuit 210 is supplied with electrical power by a power source circuit 211A, and is connected to, for example, a communication line via a communication circuit 211B, thereby enabling exchange of information with a route server, another terminal, a general purpose computer, an information server, and the like (not shown) connected to this communication line.

Figure 4:
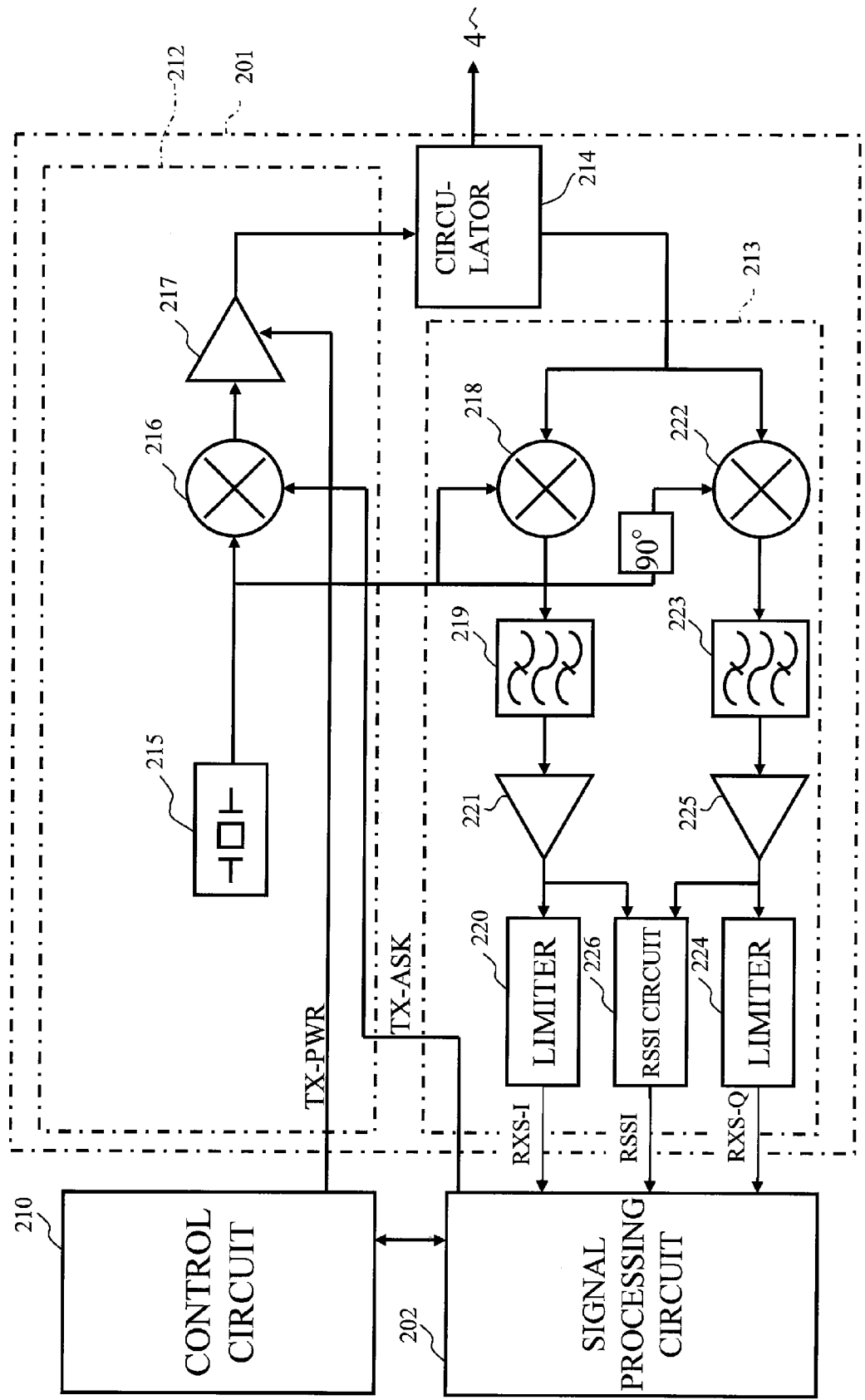
FIG. 4 is a functional block diagram showing the detailed functions of a radio frequency circuit.

FIG. 4 is a functional block diagram showing the detailed functions of the radio frequency circuit 201. In FIG. 4, the radio frequency circuit 201 is composed of a transmitting portion 212 for transmitting a signal to the RFID circuit element To via the antenna 4, a receiving portion 212 for inputting a reflected wave from the RFID circuit element To received by the antenna 4, and a circulator 214.

The transmitting portion 212 includes a crystal oscillating circuit 215 that generates a carrier wave for making access to (performing reading from/writing to) the RFID tag information of the IC circuit part 150 of the RFID circuit element To, a first multiplying circuit 216 (in the case of amplitude modulation, a variable amplification factor amplifier or the like may be used) for performing modulation (in this example, amplitude modification based on a "TX_ASK" signal from the signal processing circuit 212) on the carrier wave generated on the basis of a signal supplied from the signal processing circuit 212, and a first amplifier 217 for performing amplification (in this example, amplification with an amplification factor determined by a "TR_PWR" signal from the control circuit 210) on the modulated wave modulated by the first multiplying circuit 216. The output of the first amplifier 217 is transmitted to the antenna 4 via the circulator 214 and supplied to the IC circuit part 150 of the RFID circuit element To.

The receiving portion 213 includes a second multiplying circuit 218 for performing multiplication between the reflected wave from the RFID circuit element To received by the antenna 4 and the carrier wave generated as mentioned above, a band-pass filter 219 for extracting only a signal of a required band from the output of the second multiplying circuit 218, a second amplifier 221 for amplifying the output of the band-pass filter 219 and supplying the resultant to a first limiter 220, a third multiplying circuit 222 for performing multiplication between the reflected wave from the RFID circuit element To received by the antenna 4 and a carrier wave whose phase has been shifted by 90° after being generated as described above, a band-pass filter 223 for extracting only a signal of a required band from the output of the third multiplying circuit 222, and a third amplifier 225 for inputting and amplifying the output of the band-pass filter 223 and supplying the resultant to a second limiter 224. A signal "RXS_I" output from the first limiter 220, and a signal "RXS_Q" output from the second limiter 224 are input to the signal processing circuit 202 for processing.

Further, the outputs of the second amplifier 221 and third amplifier 225 are also input to a RSSI (Received Signal Strength Indicator) circuit 226, and a signal "RSSI" indicating the strengths of these signals are input to the signal processing circuit 202. In this way, in the tag-label producing device M according to this embodiment, demodulation of the reflected wave from the RFID circuit element To is performed through IQ quadrature demodulation.

Figure 5:
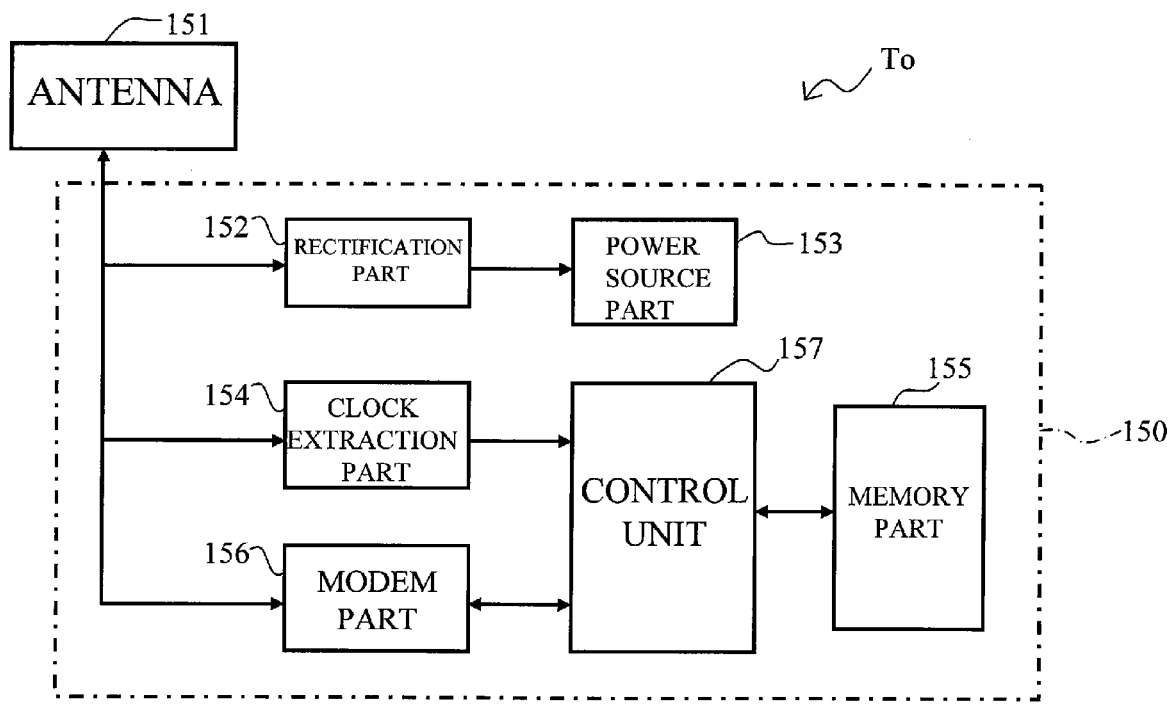
FIG. 5 is a functional block diagram showing the functional configuration of a RFID circuit element equipped in a tag label tape with print.

FIG. 5 is a functional block diagram showing the functional configuration of the RFID circuit element To equipped to the tag label tape 108 with print mentioned above.

In FIG. 5, the RFID circuit element To has the antenna 151 for performing transmission/reception of a signal to/from the antenna 4 on the tag-label producing device M side in a non-contact manner using a radio frequency of the UHF band or the like, and the IC circuit part 150 connected to the antenna 151.

The IC circuit part 150 includes a rectification part 152 for rectifying the carrier wave received by the antenna 151, a power source part 153 for storing the energy of the carrier wave rectified by the rectification part 152 to use the stored energy as a drive power source, a clock extraction part 154 for extracting a clock signal from the carrier wave received by the antenna 151 and supplying it to a control unit 157, a memory part 155 that functions as an information storage part capable of storing a predetermined information signal, a modem part 156 connected to the antenna 151, and the control unit 157 for controlling the actuation of the RFID circuit element To via the rectification part 152, the clock extraction part 154, the modem part 156, and the like.

The modem part 156 performs demodulation of a communication signal from the antenna 4 of the tag-label producing device M received by the antenna 151, and on the basis of a response signal from the control unit 157, modulates and reflects the carrier wave received by the antenna 4.

The control unit 157 executes a basic control, such as interpreting the received signal demodulated by the modem part 156, generating a reply signal on the basis of an information signal stored in the memory part 155, and returning the reply signal by the modem part 156.

Figure 6A:
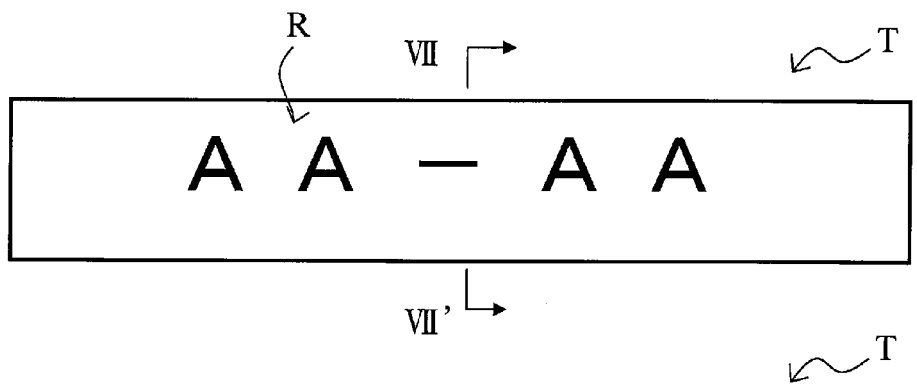
FIGS. 6A and 6B are a top view and a bottom view, respectively, showing an example of the outward appearance of a RFID label.
Figure 6B:

FIGS. 6A and 6B are views each showing an example of the outward appearance of the RFID label T that is formed after completing reading (or writing) of information with respect to the RFID circuit element To and cutting of the tag label tape 108 with print as described above. FIG. 6A is a top view, and FIG. 6B is a bottom view. Further, FIG. 7 is a transverse sectional view showing the section taken along the line VII-VII' of FIG. 6A.

Figure 7:
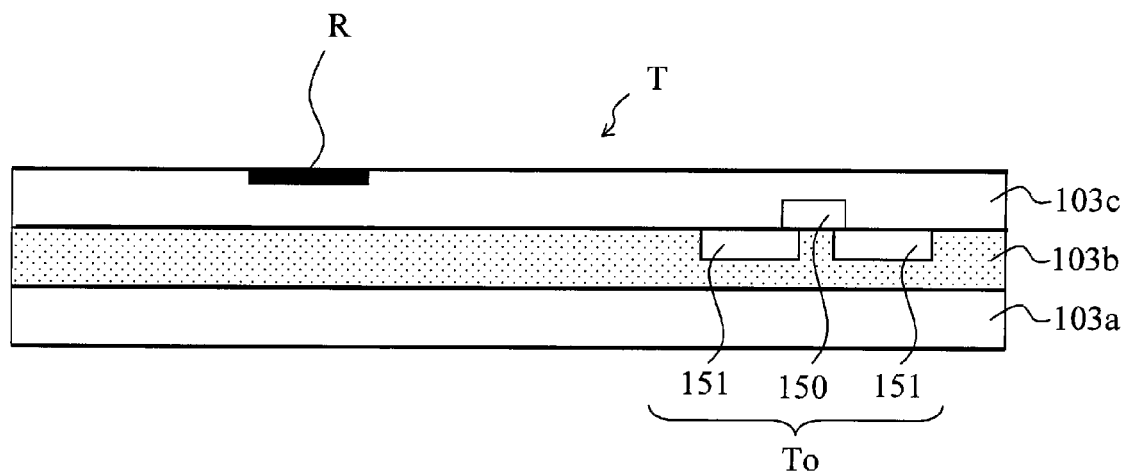
FIG. 7 is a transverse sectional view taken along the line VII-VII' of FIG. 6.

In FIGS. 6A, 6B, and 7, the RFID label T is of a three-layer structure as described above, in which the cover film 103c, the adhesive layer 103*b*, and the separation sheet 103*a* are laminated in the stated order from the front surface side (the upper side in FIG. 7) toward the opposite side thereof (the lower side in FIG. 7). Further, as described above, the RFID circuit element To composed of the ID circuit part 150 and the antennas 151 is provided to the back side of the cover film 103*c*, and the print R (in this example, the character "AA-AA") is printed on the front surface of the cover film 103*c*.

In the basic construction as described above, the principal feature of the present invention resides in increasing the dimension in the thickness direction within the cartridge 100 (see symbol t in FIG. 11 that will be described later) toward the lower side of the cartridge (forward side in the loading direction) when loaded, and also increasing the width dimension of the tag tape 103 wound around the tag tape roll 101 within the cartridge 100 toward the lower side thus increased. The principal feature of the present invention further resides in using the area of the tag tape 103 directly facing the print head 8 as a print area, and using the area below the print area as an area (safety area) where the RFID circuit elements To are aligned. Detailed description will be given below in this regard with reference to FIGS. 8 to 12.

Figure 8:
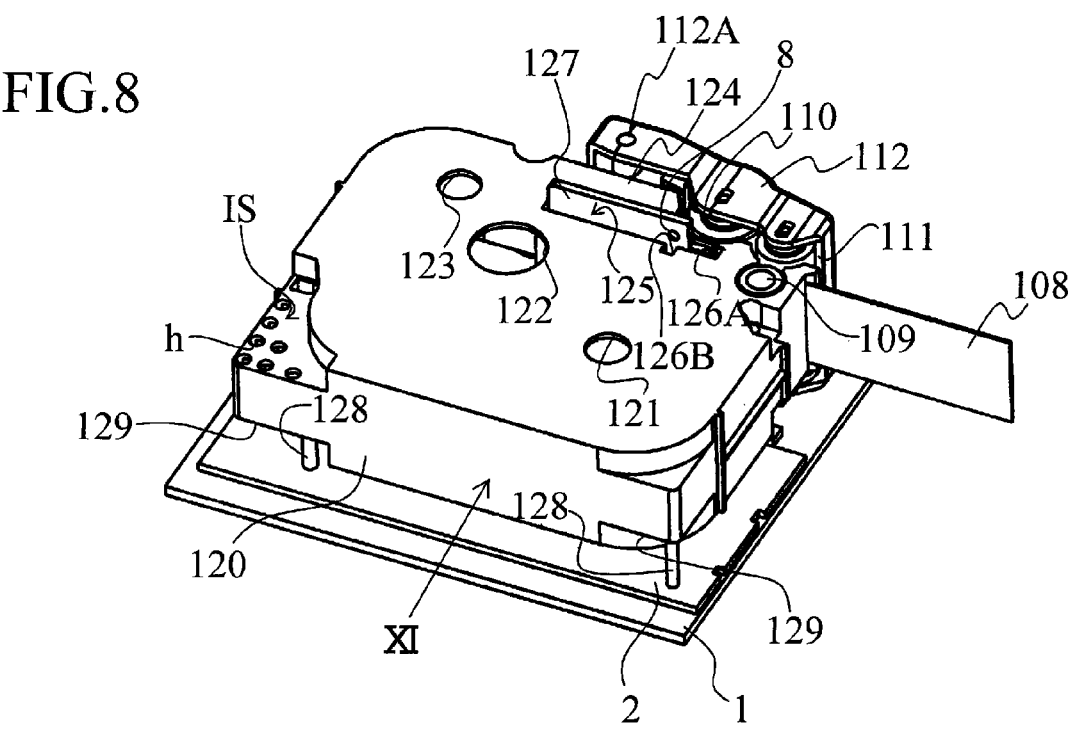
FIG. 8 is a perspective view showing the detailed structure of the cartridge and its vicinity.

FIG. 8 is a perspective view showing the detailed structure of the cartridge 100 together with its peripheral portion.

In FIG. 8, the cartridge 100 includes the case 120 as the housing constituting the outer shell of the cartridge 100. The case 120 is provided with a supporting hole 121 for rotatably supporting the tag tape roll 101, a supporting hole 122 for rotatably supporting the ribbon take-up roll 105, and a supporting hole 123 for rotatably supporting the tape feed roller 102.

Further, provided on the other side (the right front side in FIG. 8) of the case 120 is an arm part (guide part) 124 that guides the tag tape 103 paid out from the tag tape roll 101 and the ink ribbon 104 paid out from the ribbon-supply-side roll 106, and carries them out from an opening (not shown) at a projecting end portion. Further, a head mounting part 125 in which the print head 8 is inserted and mounted is formed on the front left-hand side of the arm part 124 in FIG. 8. In the wall portion of the head mounting part 125 opposed to the arm part 124, a first fitting portion 126A is formed so as to run in the tape discharge direction, and a second fitting part 126B is formed so as to run in the direction orthogonal to the first fitting part 126A.

Further, in the cartridge holder part 2, the roller holder 112, which is supported so as to be rotatable about a support shaft 112A provided upright on the main body 1, is disposed to as to be opposed to the cartridge 100. The sub-roller 111 and the platen roller 110 are rotatably supported on the roller holder 112. The tag tape 103 is drawn out from the tag tape roll 101 by the tape feed roller 102 and the sub-roller 111 acting in cooperation with each other as described above. After being led out to the head mounting part 125 from the opening of the arm part 124, the tag tape 103 is held between the print head 8 and the platen roller 110, and then further held between the tape feed roller 102 and the sub-roller 111. Further, the ink ribbon 104 is drawn out from the ribbon-supply-side roll 106 by the ribbon take-up roller 105, and led out to the head mounting part 125 from the opening of the arm part 124 before being taken up on the periphery of the ribbon take-up roller 105.

Figure 9:
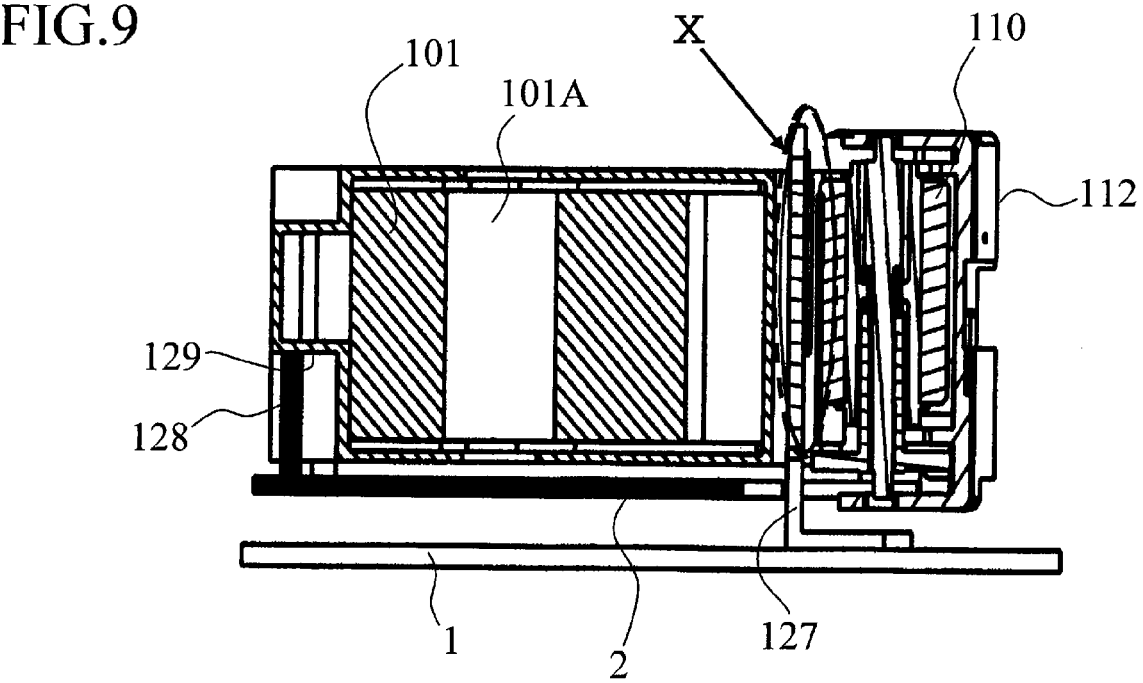
FIG. 9 is a transverse sectional view taken along the line IX-IX' of FIG. 2, showing the detailed structure in the vicinity of a roller holder and a print head.
Figure 10:
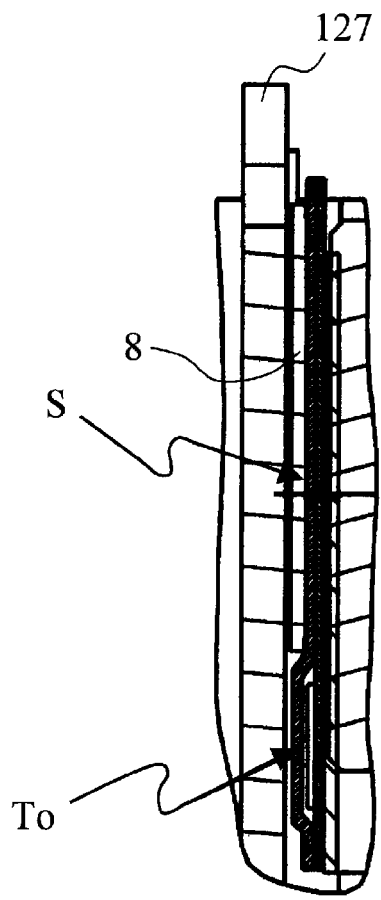
FIG. 10 is a partially enlarged view showing the portion X of FIG. 9.

FIG. 9 a transverse sectional view taken along the line IX-IX' of FIG. 2, showing the detailed structure in the vicinity of the roller holder 112 and the print head 8. FIG. 10 is a partially enlarged view showing the portion X of FIG. 9.

In FIGS. 9 and 10, a head holder 127 is fixed onto the main body 1 on one side (the right side in FIG. 9) of the cartridge holder part 2, and the print head 8 is mounted on the head holder 127.

The head holder 127 is provided with a first protrusion (not shown) fitted into the first fitting part 126A, and a second protrusion (not shown) fitted into the second fitting part 126B. Through the positioning due to the fitting engagement as described above, the cartridge 100 can be reliably and readily loaded onto the cartridge holder part 2 without the tag tape 103 and the ink ribbon 104 exposed from the arm part 124 at the head mounting part 125 coming into contact with the print head 8 or the head holder 127.

Figure 11:
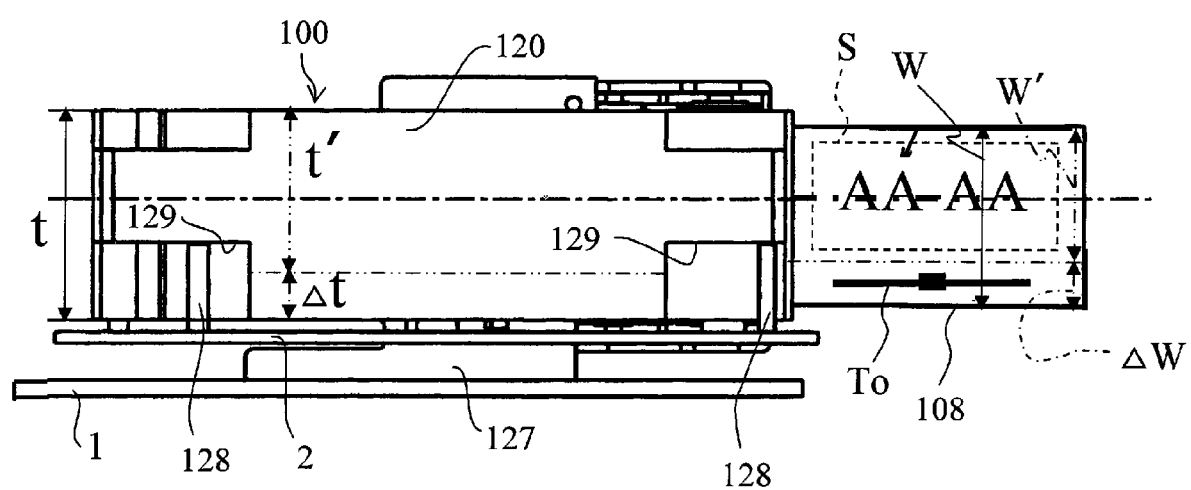
FIG. 11 is a side view as seen in the direction of the arrow XI of FIG. 8.

FIG. 11 is a side view as seen in the direction of an arrow XI of FIG. 8. In correspondence with the construction of the tag tape 103 as described above, in the tag label tape 108 with print, the plurality of RFID circuit elements To are aligned at an end on one side (the lower side in FIG. 7) in the width direction of the tag label tape 108 with print (=the above-mentioned safety area), and the other side (the upper side in FIG. 7) in the width direction with respect to the RFID circuit elements To serves as a print area that has been subjected to corresponding printing (in this example "AA-AA").

Here, in order to realize the arrangement of the tag tape 103 and tag label tape 108 with print as described above, according to the most distinctive feature of this embodiment, the dimension t in the thickness direction of the cartridge 100 is increased from a regular dimension t' (for example, that of the tag-label producing device of the related art described above) by $\Delta t$ toward the lower side (the lower side in FIG. 11) of the cartridge 100 when loaded; in addition, the dimension W in the width direction of each of the tag tape 103 and the tag label tape 108 with print is also increased from the regular dimension W' by $\Delta W$ toward the lower side, with the RFID circuit element To being arranged in the area corresponding to the increased width $\Delta W$ (in this example, this area serves as the safety area). As a result, a print area S of the regular size can be secured in the area directly facing the print head 8.

The vertical positioning of the cartridge 100 so as to make the print head 8 directly face the print area S is effected by a projection-like cartridge positioning member (positioning support part) 128 provided upright (for example, at four locations corresponding to positions in the vicinity of the four corners of the cartridge 100) on the cartridge holder part 2, and by a positioning recess (cartridge positioning part) 129 provided in a lower part of the case 120 of the cartridge 100 so as to come into engagement with the cartridge positioning member 128.

Figure 12A:
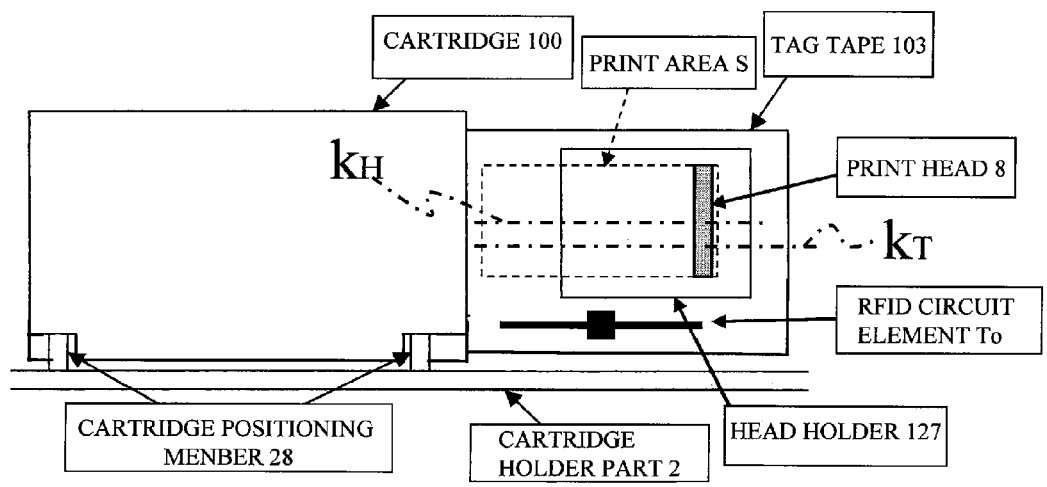
FIGS. 12A and 12B are views showing the cartridge according to the first embodiment of the present invention as opposed to a regular cartridge with no RFID circuit element.
Figure 12B:
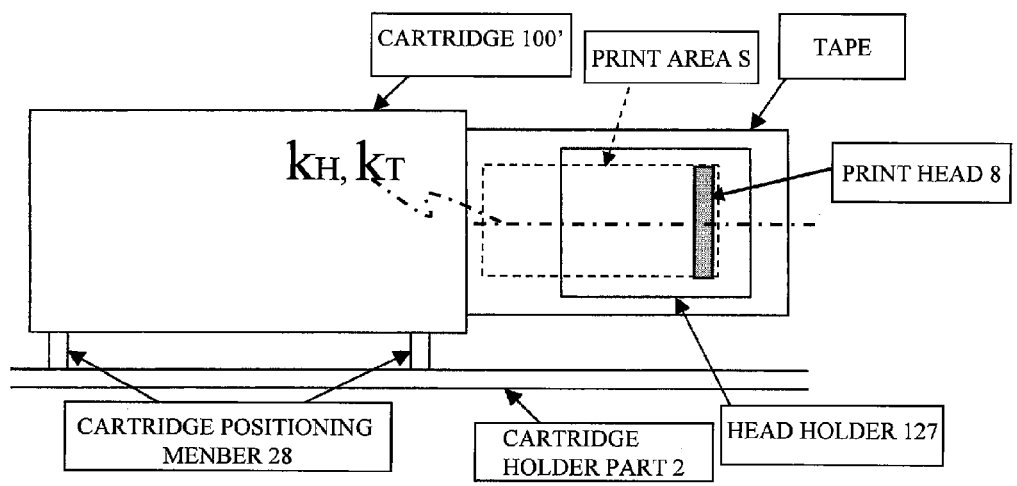

In this example, in particular, since positioning is effected by means of the positioning member 128 of the cartridge holder part 2 and the positioning recess 129 of the cartridge 100, the present invention is applicable not only to the cartridge 100 of this embodiment as shown in FIG. 12A but also to a conventional cartridge 100' (with printing being performed on a print-receiving tape with no RFID circuit element) as shown in FIG. 12B.

That is, while in the cartridge 100 shown in FIG. 12A the centerline kH of the print head 8 in the tape width direction and the centerline kT of the tag label tape 108 with print in the tape width direction are eccentric to each other, in the cartridge 100' shown in FIG. 12B, the centerline kH of the print head 8 in the tape width direction and the centerline kT of the tag label tape 108 with print in the tape width direction coincide with each other, and also the dimension of the tape in the width direction is substantially equal to the dimension of the print head in the same direction. In the cartridge 100', for example, no positioning recess 129 is provided as shown in the drawing, and by directly abutting the positioning member 128 against the lower surface of the cartridge 100', the present invention is commonly applicable with the same device structure regardless of the above-described difference in structure.

In the tag-label producing device M according to this embodiment constructed as described above, predetermined printing is performed on the tag tape 103 by the print head 8 while paying out the tag tape 103 from the tag tape roll 101, thereby producing the tag label tape 108 with print. Further, after performing reading/writing of RFID tag information via the antenna 4 with respect to the RFID circuit element To equipped in the tag tape 103, the tag label tape 108 with print is cut into a predetermined size including the RFID circuit element To, thereby completing the RFID label T with the print information R.

In this embodiment, in the tag tape 103 of the tag tape roll 101, as shown in FIGS. 11 and 3, the plurality of RFID circuit elements To are aligned so as to be positioned closer to the safety area that is located on one side in the tape width direction (in this example, the lower side of the cartridge 100 when loaded), and the other remaining side (the upper side of the cartridge 100 when loaded) serves as the print area S where printing is performed by the print head 8. Accordingly, when the tag tape 103 including the RFID circuit element To is introduced from the arm part 124 to the print head 8 side for printing to be held between the print head 8 and the platen roller 110 and the printing is started, it is possible to prevent an external force (larger than that acting on the other regular shaped portion) from being applied to the uneven shaped portion of the RFID circuit element To (of the IC circuit part 150, in particular) by the print head 8. As a result, printing can be performed in a satisfactory manner without the print R due to the print head 8 being affected by the uneven configuration of the portion where the RFID circuit element To is arranged.

Further, at this time, due to the positioning structure with the cartridge positioning member 128 and the positioning recess 129 described above, by simply loading the cartridge 100 onto the cartridge holder part 2 of the tag-label producing device M, the positioning of the cartridge 100 is effected and the print area S can be made to directly face the print head 8.

The arrangement of the RFID circuit element To in a portion of the tag tape 103 on the lower side of the cartridge when loaded as described above is also due to the following consideration. That is, to secure the arrangement area for the RFID circuit element To separately from the print area while securing the same dimension of the print area S in the tape width direction as that in the related art, it is necessary to enlarge the width of the tag tape 103 rearward in the loading direction (or forward in the loading direction) at the time of loading the cartridge 100 than is normally required, and also to enlarge the dimension of the cartridge 100 itself rearward (or forward in the loading direction) in the loading direction at the time of loading.

Here, due to the inherent structure of the cartridge holder part 2 onto which the cartridge 100 is mounted in the tag-label producing device, the side of the cartridge holder part 2 located forward in the loading direction at the time of loading the cartridge often remains as a free space (corresponding to the portion of the height dimension Δt in FIG. 11, for example). In this embodiment, the RFID circuit elements To are arranged in a portion of the tag tape 103 located forward in the direction at the time of loading the cartridge 100, and the dimension of the cartridge 100 is enlarged forward in the loading direction, whereby the above-mentioned free space located forward in the loading direction can be effectively utilized.

Further, in this embodiment, as described above with reference to FIGS. 12A and 12B, both the production of the RFID label T by mounting the cartridge 100 equipped with the RFID circuit element To and the production of a regular label with no RFID tag by mounting the regular (conventional) cartridge 100' with no RFID circuit element To can be performed by a single device M, thereby making it possible to achieve improved usability on the user side.

It should be noted that this embodiment is not limited to the example described above but can be modified in various ways without departing from the scope and technical idea of the present invention. Such modifications will be sequentially described below. It should be noted that in the following modifications, the portions that are the same as those of the above-mentioned embodiment are denoted by the same reference numerals and description thereof will be omitted as appropriate.

Figure 13:
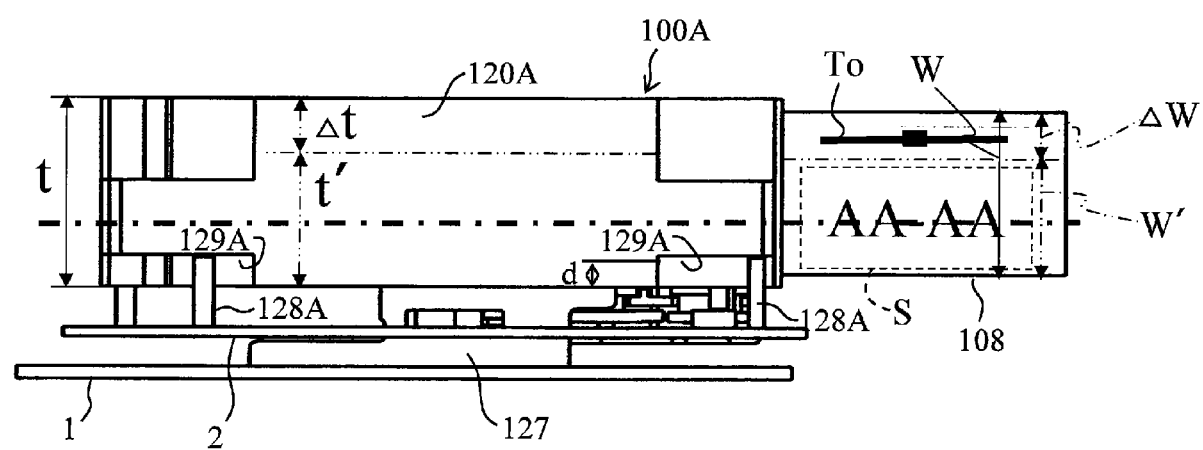
FIG. 13 is a side view of the cartridge as seen in the direction of an arrow, according to a modification in which the dimension in the thickness direction of the cartridge is enlarged toward the upper side of the cartridge when loaded.

(1-1) Structure in which the Dimension of the Cartridge 100 in the Thickness Direction is Enlarged Toward the Upper Side Of the Cartridge (Rearward in the Loading Direction) when Loaded FIG. 13 is a side view corresponding to FIG. 11 described above, of a cartridge 100A according to this modification.

In FIG. 13, according to this modification, in the tag tape 103 and the tag label tape 108 with print, the plurality of RFID circuit elements To are aligned at an end (=the above-described safety area according to this example) on the other side in the width direction (corresponding to the upper side in FIG. 13) opposite to the side according to the above-mentioned embodiment, and one side in the width direction with respect to each RFID circuit element To (corresponding to the lower side in FIG. 13) serves as the print area S where printing corresponding to the each RFID circuit element To is performed.

Further, in order to realize such arrangement of the tag tape 103 and the tag label tape 108 with print, according to this modification, the dimension t in the thickness direction of the cartridge 100A is enlarged from a regular dimension t' (for example, that of the tag-label producing device of the related art described above) by Δt toward the upper side (the lower side in FIG. 13) of the cartridge 100A when loaded; in addition, the dimension W in the width direction of each of the tag tape 103 and the tag label tape 108 with print is also enlarged from the regular dimension W' by Δw toward the upper side (rearward in the loading direction of the cartridge), with the RFID circuit element To being arranged in the area corresponding to the enlarged width ΔW (in this example, this area serves as the safety area). As a result, a print area S of the regular size can be secured in the area directly facing the print head 8.

The vertical positioning of the cartridge 100A so as to make the print head 8 directly face the print area S is effected by a projection-like cartridge positioning member (positioning support part) 128A provided upright (for example, at four locations corresponding to positions in the vicinity of the four corners of the cartridge 100A) on the cartridge holder part 2, and by a positioning recess (cartridge positioning part) 129A provided in a lower part of a case 120A of the cartridge 100A so as to come into engagement with the cartridge positioning member 128A.

At this time, as can be appreciated from the comparison between FIGS. 13 and 11, the recessed depth d of the positioning recess 129A of the cartridge 100A is set smaller than that in FIG. 11. Since such a recess 129A is supported on the positioning member 128A shown in FIG. 13 that is substantially the same as the cartridge positioning member 128 shown in FIG. 11, the support height of the cartridge 100A as a whole is shifted upward, thereby realizing a construction in which the position of the print head 8 is shifted relatively downward.

In this modification also, as in the above-mentioned embodiment, when the tag tape 103 including the RFID circuit element To is introduced from the arm part 124 to the print head 8 side for printing, it is possible to prevent an external force (larger than that acting on the other regular shaped portion) from being applied to the uneven shaped portion of the RFID circuit element To (of the IC circuit part 150, in particular) by the print head 8. As a result, printing can be performed in a satisfactory manner without the print R due to the print head 8 being affected by the uneven configuration of the portion where the RFID circuit element To is arranged. Further, at this time, due to the positioning structure with the cartridge positioning member 128A and the positioning recess 129A described above, the print area S can be made to directly face the print head 8 by simply loading the cartridge 100A onto the cartridge holder part 2.

Further, arranging the RFID circuit element To in the portion of the tag tape 103 located on the upper side of the cartridge when loaded is also due to the following consideration.

That is, as in the above-mentioned tag-label producing device M, normally, in many cases, the open/close cover OC is covered from above the cartridge holder part 2 after loading the cartridge 100, so that the portion above the cartridge holder part 2 becomes exposed when the cover OC is opened (FIG. 1 described above shows this very state). In the cartridge 100A according to this modification, the RFID circuit element To is arranged in the portion of the tag tape 100A located on the upper side when loading the cartridge. Since this means that the dimension of the cartridge 100A is enlarged toward the upper side (rearward in the cartridge loading direction), if loaded to the cartridge holder part 2 of a conventional device using a tape which does not include the RFID circuit element, the cartridge 100A projects beyond the cartridge holder part 2 by sticking out upward. However, if the device is used with the open/close cover OC being open as described above, the device can be used while permitting the sticking out of the cartridge 100A as it is. As a result, it is possible to realize the function of the tag-label producing device M while keeping the dimension of the recess of the cartridge holder part 2 the same as that of the conventional device.

It should be noted that in the structures of the cartridge positioning member 128, 128A and of the positioning recess 129, 129A of the cartridge 100, 100A according to this modification and the above-mentioned embodiment, the relation between the projection and the recess may be reversed. That is, a projection may be formed to project downward (forward in the cartridge loading direction) from the cartridge 100, 100A side, with a recess that engages (mates) with this projection being provided on the side of the cartridge holder part 2 or the main body 1. In this case also, by setting the recessed depth of the recess (or the projecting height of the projection) as appropriate, as described above with respect to how the arranging area of the RFID circuit element To in the tape width direction is set according to the difference in cartridge supporting height between FIGS. 13 and 11, and to the comparison between FIGS. 12A and 12B, the cartridge can be used in common with the regular (conventional) cartridge.

(1-2) Structure in which the Print Head is Movable

Figure 14A:
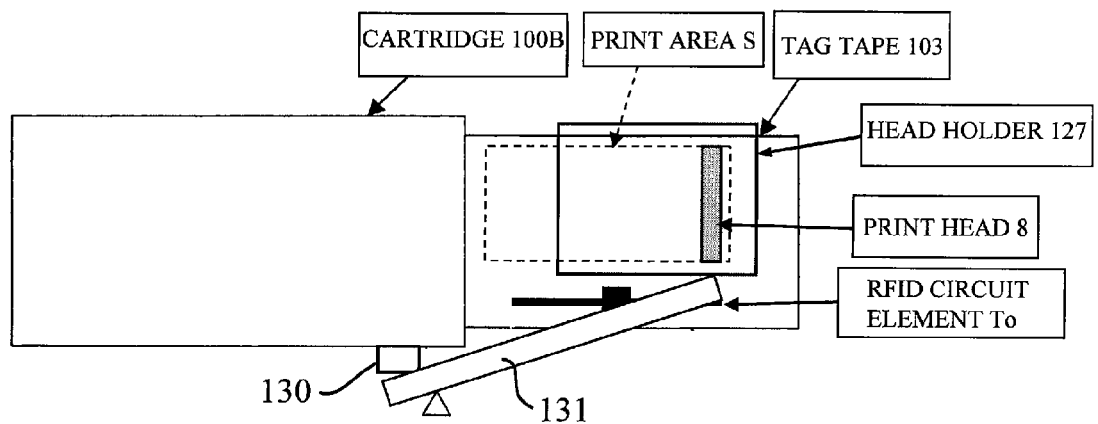
FIGS. 14A and 14B are conceptual diagrams schematically showing the positional relation between the cartridge and the print head according to a modification in which the print head is adapted to be movable.
Figure 14B:
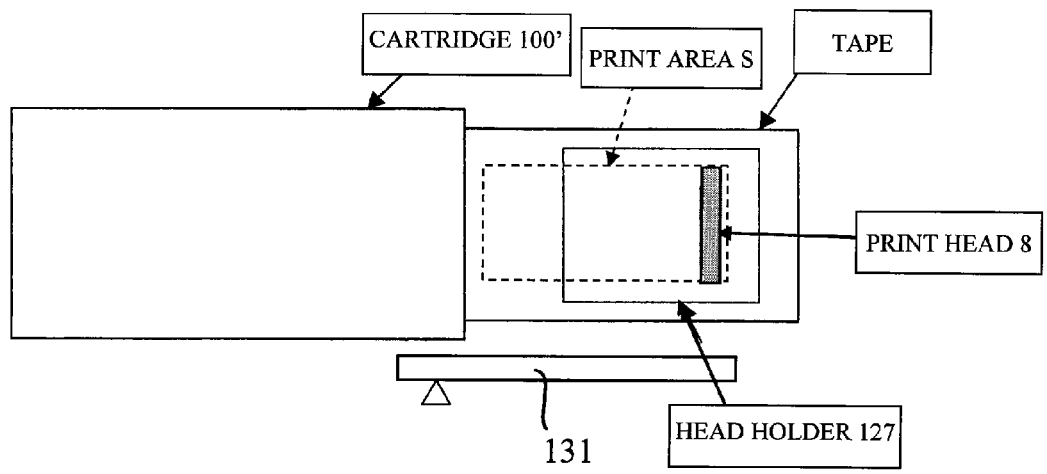

FIGS. 14A and 14B are conceptual diagrams corresponding to FIGS. 12A and 12B described above and schematically showing the positional relation between a cartridge 100B and the print head (movable print head) 8 according to this modification.

In FIG. 14A, the cartridge 100B has a lever-driving projection (print-head positioning part) 130 in a lower part thereof, for example. Although detailed illustration and description are omitted, the head holder 127 including the print head 8 is connected to the case 120 via an appropriate slide mechanism, rotation mechanism, or the like so as to be displaceable in the height direction (the vertical direction in the drawing; in other words, the tape width direction). Upon loading the cartridge 100B, the projection 130 comes into engagement (or abutment) with a lever mechanism (print-head moving mechanism) 131 (or in a recess formed therein) that is connected and fixed to the main body 1 or the cartridge holder part 2, whereby the cartridge 100B with the head holder 127 is pushed up as a whole. As a result, the print head 8 undergoes positioning with respect to the tape width direction so as to directly face the print area S. Accordingly, printing can be reliably performed with respect to the print area S provided separately from the above-described safety area where the RFID circuit element To is provided, thereby realizing the same effect as that described above.

In this modification as well, like the above-mentioned embodiment described with reference to FIG. 12B, in the case of the regular cartridge 100' with no projection 130, the lever mechanism 131 is not driven and the print head 8 is held stationary at a regular position as shown in FIG. 14B. Accordingly, the print head 8 can be made to directly face the print area S of the regular tape (whose dimension in the width direction is substantially the same as the dimension of the print head 8 in the width direction) discharged from the cartridge 100'. That is, in this modification also, both the production of the RFID label T by mounting the cartridge 100B equipped with the RFID circuit element To and the production of a regular (conventional) cartridge 100' with no RFID circuit element To with no RFID tag can be performed by using a single device M, thereby making it possible to achieve improved usability on the user side.

It is needless to mention that as described in the section (2) above, the relation between the projection and the recess may be reversed in this modification as well. That is, the projection may be provided on the lever mechanism 131 side, with the engagement (or abutment) recess (or flat part) for driving the lever being provided on the cartridge 100 side. The same effect as described above can be attained in this case as well.

(1-3) Print Area Restricting Control

This refers to a control in which, rather than ensuring satisfactory printing by changing the relative position of the print head 8 with respect to the tape side to thereby prevent the print head 8 from directly facing the RFID circuit element To itself, the printing operation area of the print head 8 is restricted with respect to the tape width direction while keeping the regular position of the print head 8 as it is, thereby prohibiting printing operation with respect to the portion corresponding to the RFID circuit element To. In this case, unlike in the above-mentioned embodiment, it is unnecessary to increase the dimension of the cartridge 100 in the thickness direction by $\Delta t$ forward or rearward in the loading direction when loading the cartridge 100 but the same dimension as the regular dimension t' (for example, that of the tag-label producing device of the related art described above) suffices. Further, it is also unnecessary to increase the width direction W of each of the tag tape 103 and the tag label tape 108 with print by $\Delta W$ forward or rearward in the cartridge loading direction but the regular dimension W' suffices.

Figure 15:
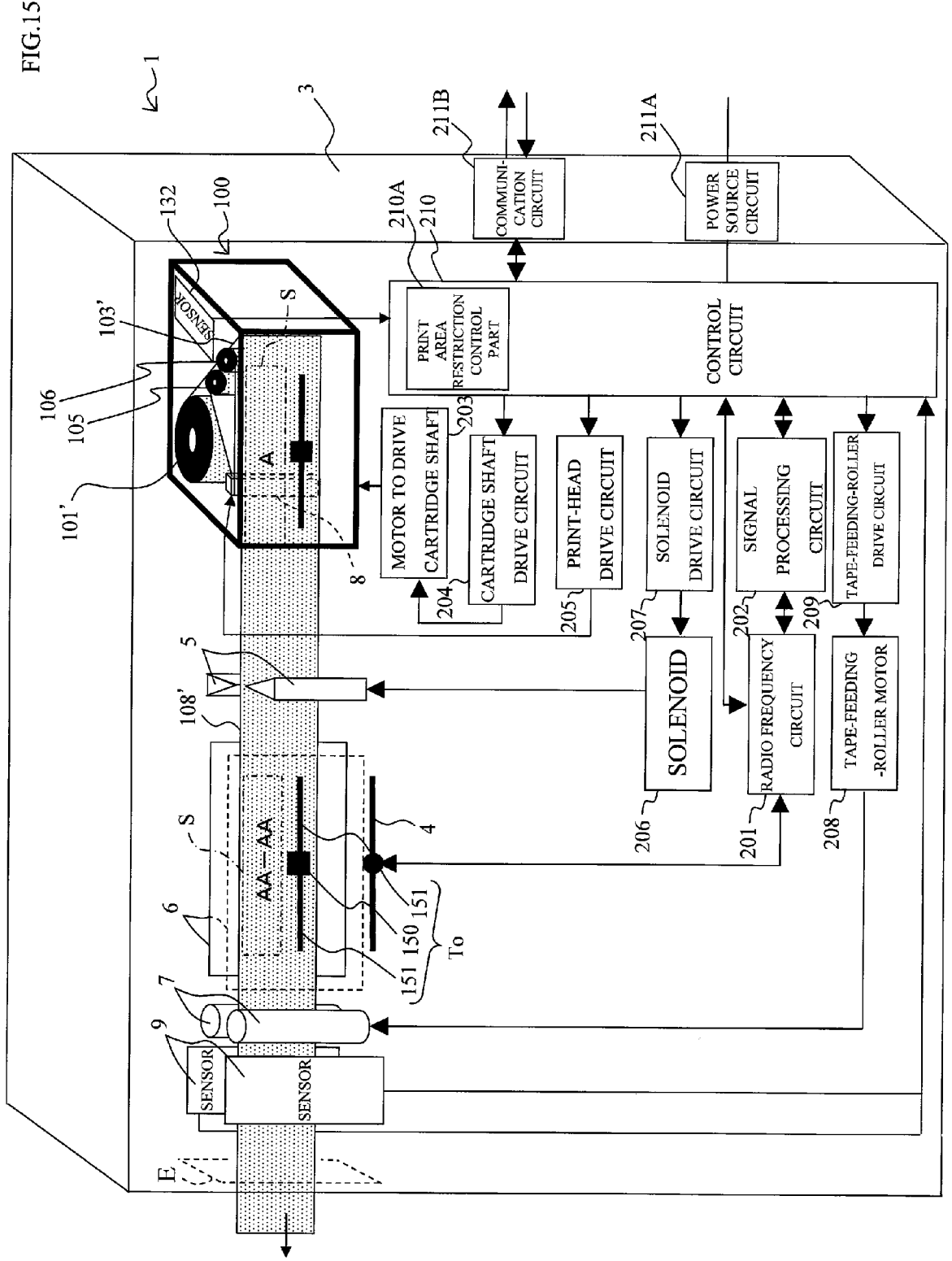
FIG. 15 is a conceptual diagram showing the details of the main body according to a modification in which restricting control is performed on the printing operation area.

FIG. 15 is a conceptual diagram showing the details of the main body 1 according to this modification and corresponding to FIG. 3 described above. As shown in FIG. 15, in this modification, the control unit 210 is provided with a print area restricting control part (print control means) 210A for performing the above-described restricting control of the printing operation area.

Figure 16:
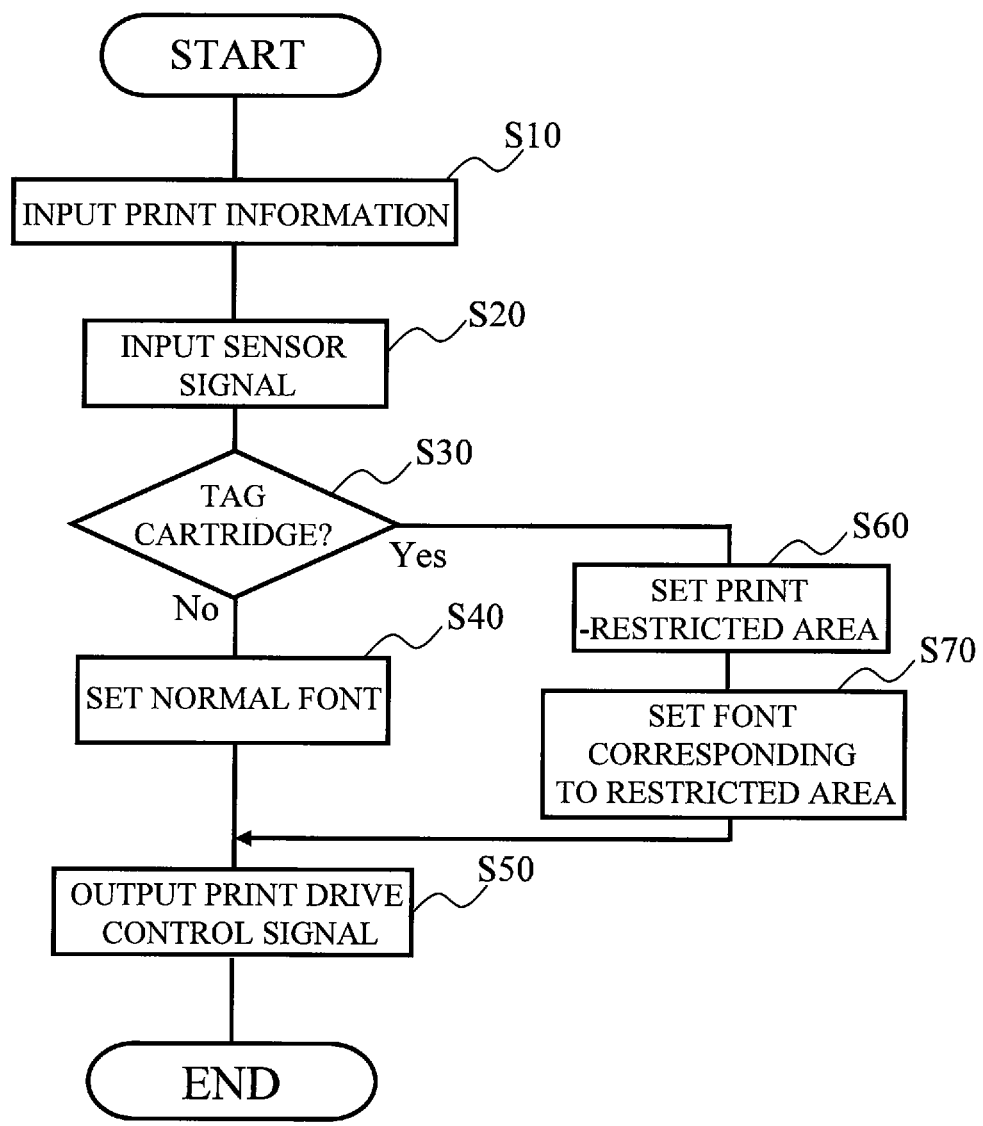
FIG. 16 is a flowchart showing the procedure of control executed by a print area restricting control part.

FIG. 16 is a flowchart showing the procedure of control executed by the print area restricting control part 210A.

In FIG. 16, first, in step S10, character information (print information) to be printed, which is designated and input with an operation part (not shown) of the main body 1, such as an operation key, is input.

The process then transfers to step S20, and a detection signal including respective parameter information from the cartridge sensor 132 is input.

Then, in step S30, on the basis of the detection signal input in step S20, it is determined whether or not the cartridge loaded at that time is a cartridge (for example, the cartridge 100, 100A, 100B described above) equipped with the RFID circuit element To.

If the cartridge is a regular (conventional) cartridge (for example, the cartridge 100' described above) with no RFID circuit element To, the determination is not satisfied, and the process transfers to step S40 where the regular print character setting is performed under the assumption of a regular print operation control without any particular print area restriction (printing is performed over the most of the dimension of the tape 103 in the width direction).

When step S40 is finished, the process transfers to step S50 where a print control signal corresponding to the print font set in step S40 is output to the print-head drive circuit 205, the print head 8 is caused to perform the corresponding regular operation, and this operation flow is finished.

On the other hand, if the cartridge is a cartridge (RFID circuit element cartridge) with the RFID circuit element To, the determination of step S30 described above is satisfied, and the process transfers to step S60.

In step S60, on the basis of, for example, information on the width of the tape 103', information on the width of the RFID circuit element To, and the like included in the detection signal input in step S20, the print restriction area (=the print area S other than the area for arranging the RFID circuit element To) is set. Conversely, of the dimension of the tag tape 103' in the width direction, an area where printing by the print head 8 is not performed and which corresponds to the position of the RFID circuit element To may be set.

Thereafter, the process transfers to step S70 where print character font setting corresponding to the restriction area set in step S60 is performed. In this case, the set font is a font smaller than the regular font set in step S40 (or may be a font or the like that is compressed only in its dimension in the tape width direction).

When step S70 is completed, the process transfers to step S50 described above, and a print control signal corresponding to the print font set in step S70 is output to the print-head drive circuit 205, and the print head 8 is caused to perform restricted-area print operation, thereby completing this operation flow.

In this modification, as described above with reference to the flow of FIG. 16, the print area restricting control part 210A restricts and controls the printing operation area of the print head 8 so that no printing is performed with respect to the RFID circuit element To located at an end on one side (the lower side in FIG. 15) of the tag tape 103', and while avoiding this area, printing is performed only on the other side in the width direction so as to make this portion the print area S.

Then, the tag label T is produced using the tag tape 108' onto which printing has been performed in this way. Accordingly, the printing by the print head 8 is not affected by the uneven configuration of the portion where the RFID circuit element To is arranged, whereby printing can be performed in a satisfactory manner as in the above-mentioned embodiment.

It should be noted that as in the modification according to the section (1-1) described above, an arrangement may be adopted in which, conversely to the above-mentioned configuration, printing is not performed with respect to the RFID circuit element To located at the upper-side end in FIG. 15, and printing is performed, while avoiding this area, with respect to the print area S located on the lower side in FIG. 15. This arrangement also provides the same effect as that described above.

Further, in the above-described arrangement, the print area restricting control part 210A may be configured so that its control mode includes a mode for performing restricting control of the printing operation area and a normal mode in which no such restricting control is performed, and that the control mode can be switched by means of a selection designation input or the like from the above-mentioned operating means. In this case, the above-mentioned flow of FIG. 16 may be executed only when the control mode is set to the restricting control mode. Alternatively, when the control mode is set to the restricting control mode, step S10, step S20, step S60, step S70, and step S50 of the above-described flow may be executed in the stated order, and when the control mode is set to the normal mode, step S10, step S20, step S30, step S40, and step S50 may be executed in the stated order. In this case, both the mounting of the cartridge equipped with the RFID circuit element To produce the RFID label T in the mode for performing restricting control of the printing operation range, and the mounting of the regular cartridge to produce a regular label with no RFID tag in the normal mode can be performed by means of a single device, thereby making it possible to achieve improved usability on the user side.

(1-4) Printing Method Variation

While the foregoing description is directed to the example where the present invention is applied to a printing method in which printing is performed on the tag tape 103 by the print head 8 using the ink ribbon 104, this should not be construed restrictively. The present invention may also be applied to a thermal paper type printing method using no ink ribbon.

Figure 17:
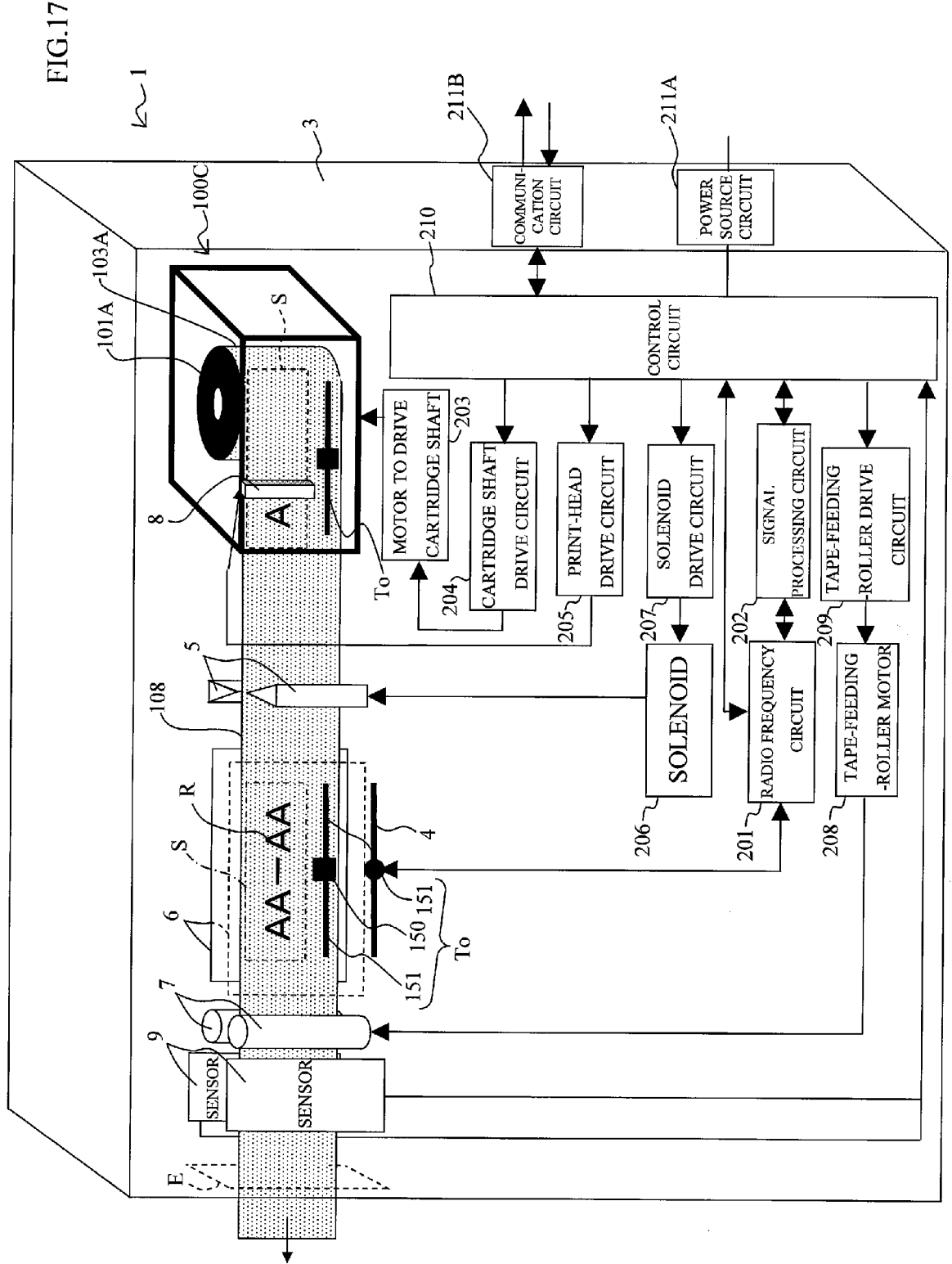
FIG. 17 is a conceptual diagram showing the details of the main body according to a modification in which the present invention is applied to a thermal paper type printing method using no ink ribbon.

FIG. 17 is a conceptual diagram showing the details of the main body 1 according to this modification and corresponding to FIGS. 3 and 15 described above.

In FIG. 17, this modification represents a case where the configuration of the present invention according to the embodiment shown in FIGS. 1 to 12 is applied to the above-mentioned thermal paper type printing method. A cartridge 100C according to this modification is provided with a tag tape roll 101A including a tag tape 103A made of thermal paper. By the print head 8 arranged on the outer peripheral side in the roll winding direction of the tag tape 103A (the frontward side in FIG. 17), printing is performed on the surface on the above-mentioned outer peripheral side without using the ink ribbon 104.

This modification is the same as the above-mentioned embodiment in that while avoiding the RFID circuit element To arranged on one side in the width direction of the tag tape 103A (the lower side in FIG. 17, corresponding to the above-described safety area), the print head 8 is adapted to directly face and perform printing only on the print area S arranged on the other side (the upper side in FIG. 17).

This modification provides the same effect as that of the above-mentioned embodiment.

It is needless to mention that not only the above-mentioned embodiment but also other modifications, such as those described in the sections (1-1) to (1-3) above, can also be applied to the thermal paper type printing method to provide the same effect.

A second embodiment of the present invention will be described with reference to FIGS. 18 to 29. According to this embodiment, the IC circuit part 150 is located in the safety area when the direction of the tag tape is deflected within the RFID cartridge. To clarify the configuration, the portions that are the same or equivalent to those of the first embodiment are denoted by the same reference numerals, and description will be given while referring to the same figures as appropriate.

Figure 18:
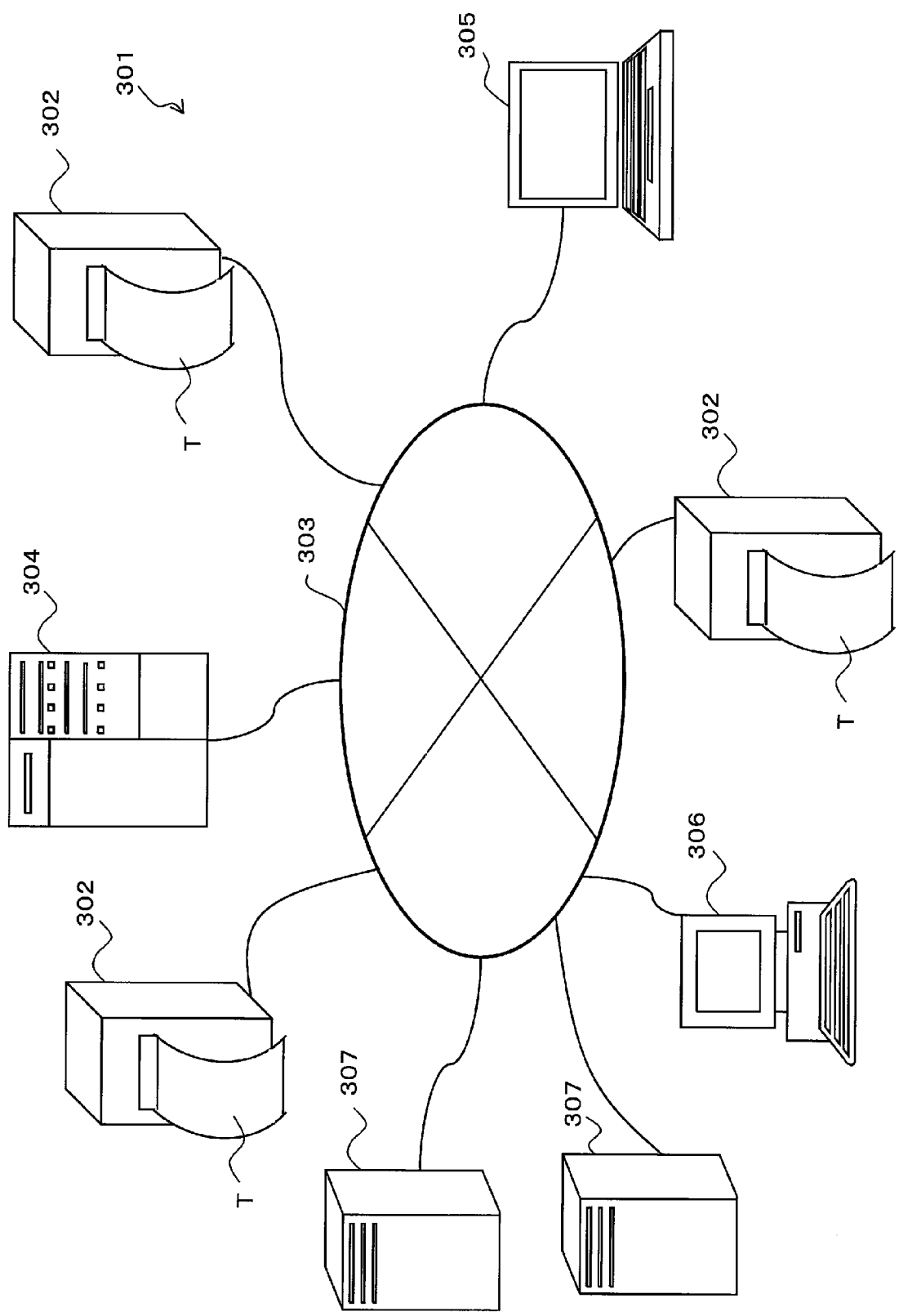
FIG. 18 is a system diagram showing a RFID tag manufacturing system (RFID tag information communicating device) to which a tag-label producing device equipped with a tag-label producing device cartridge according to a second embodiment of the present invention is applied.

FIG. 18 is a system diagram showing a RFID tag manufacturing system (RFID tag information communicating device) to which a tag-label producing device equipped with a tag-label producing device cartridge according to this embodiment is applied.

In a RFID tag manufacturing system 301 shown in FIG. 18, a tag-label producing device 302 according to this embodiment is connected to a router server 304, a terminal 305, a general purpose computer 306, and a plurality of information servers 307 via a wired or wireless communication line 303.

Figure 19:
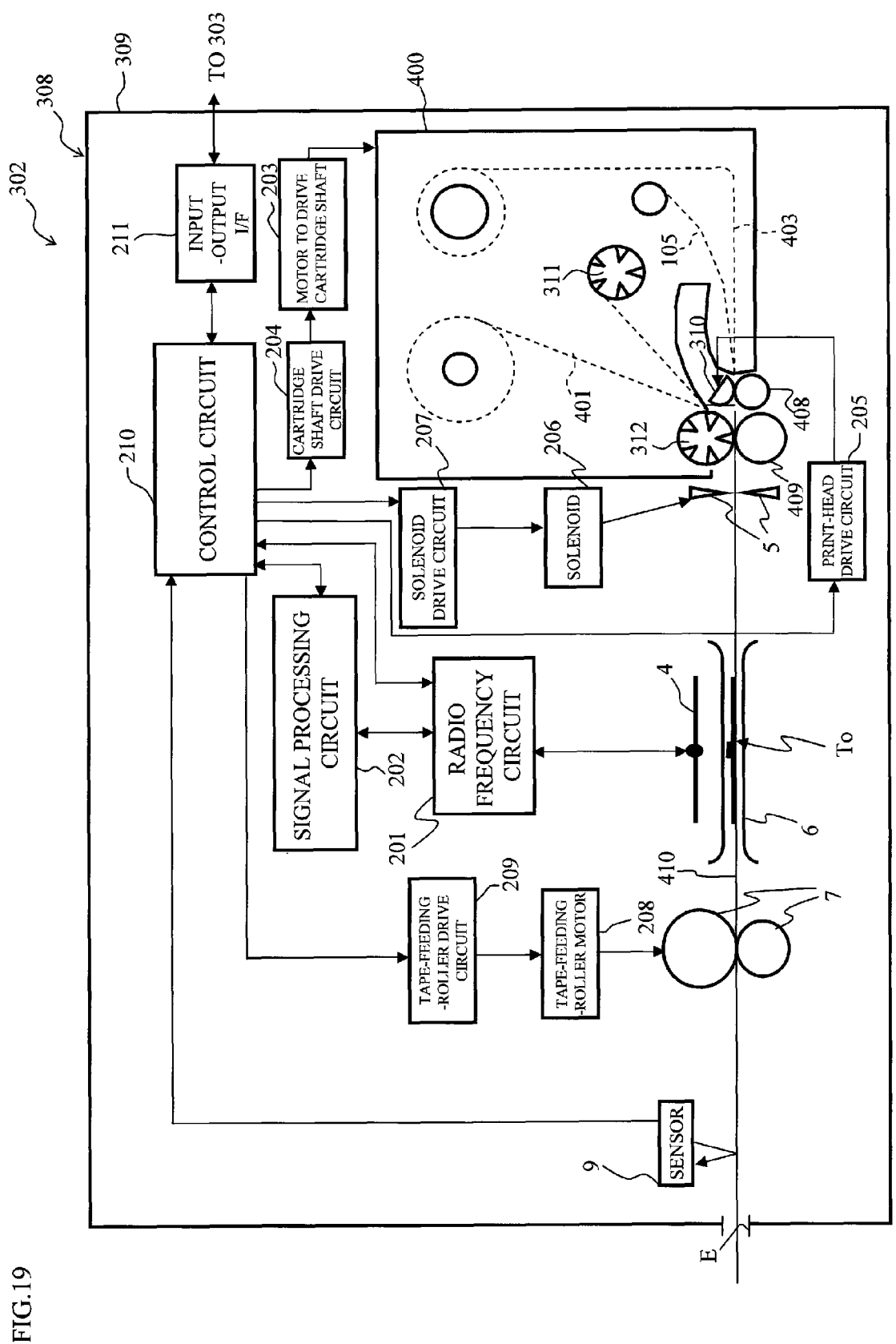
FIG. 19 is a conceptual diagram showing the details of the tag-label producing device shown in FIG. 1.

FIG. 19 is a conceptual diagram showing the detailed structure of the tag-label producing device 302.

In FIG. 19, a main body 308 of the tag-label producing device 302 is provided with a cartridge holder part (not shown) as a recessed part, and a cartridge is detachably mounted to the holder part.

The main body 308 includes: a housing 309 forming the outer shell of the main body 308 and equipped with the above-mentioned cartridge holder part in which the cartridge 400 is fitted; a print head (thermal head) 310 for performing predetermined printing on a cover film 403; a ribbon take-up roller drive shaft 311 for driving an ink ribbon 405 in which printing has been performed on the cover film 403; a pressure roller drive shaft (tape-feed-roller drive shaft) 312 for bonding the cover film (print-receiving tape) 403 and a base tape 402 together and feeding it as a tag label tape 410 with print from the cartridge 400; the antenna 4 for performing exchange of signals with the RFID circuit element To (which will be described later in detail) equipped in the tag label tape 410 with print through wireless communication using a radio frequency in the UHF band or the like; a cutter 5 for cutting the tag label tape 410 with print at a predetermine timing into a predetermined length to thereby produce the label-shaped RFID label T (which will be described later in detail); a pair of feeding guides 6 for setting and holding the RFID circuit element To within a predetermined access area opposed to the antenna 4 at the time of the signal exchange through wireless communication, and for guiding the tape 410 (=RFID label T) that has been cut; a feeding roller 7 for carrying and feeding the thus guided RFID label to the carrying-out exit E; and a sensor 9 for detecting the presence/absence of the RFID label T at the carrying-out exit E.

On the other hand, the main body 308 further includes: a radio frequency circuit 201 for accessing (for reading from or writing to) the RFID circuit element To via the antenna 4; a signal processing circuit 202 for processing signals read out from the RFID circuit element To; a motor 203 to drive cartridge shaft for driving the ribbon take-up roller drive shaft 311 and the pressure roller drive shaft 312 described above; a cartridge shaft drive circuit 204 for controlling the drive of the motor 203 to drive cartridge shaft; a print-head drive circuit 205 for controlling the supply of electric power to the print head 310; a solenoid 206 for driving the cutter 5 so as to perform the cutting operation; a solenoid drive circuit 207 for controlling the solenoid 206; a tape-feeding-roller motor 208 for driving the above-mentioned feeding roller 7; a tape-feeding-roller drive circuit 209 for controlling the tape-feeding-roller motor 208; and a control circuit 210 for controlling the operation of the tag-label producing device 302 as a whole via the radio frequency circuit 201, the cartridge shaft drive circuit 204, the print-head drive circuit 205, the solenoid drive circuit 207, the tape-feeding-roller drive circuit 209, and the like.

The control circuit 210 is a so-called microcomputer; although detailed description is omitted, the control circuit 210 is composed of a CPU as a central processing unit, a ROM, a RAM, and the like, and adapted to perform signal processing in accordance with a program previously stored in the ROM while utilizing the temporary memory function of the RAM. Further, the control circuit 210 is connected to, for example, a communication line via an input-output interface 211, thereby enabling exchange of information with the above-described route server 304, the other terminal 305, the general purpose computer 306, the information servers 307, and the like connected to this communication line.

Figure 20:
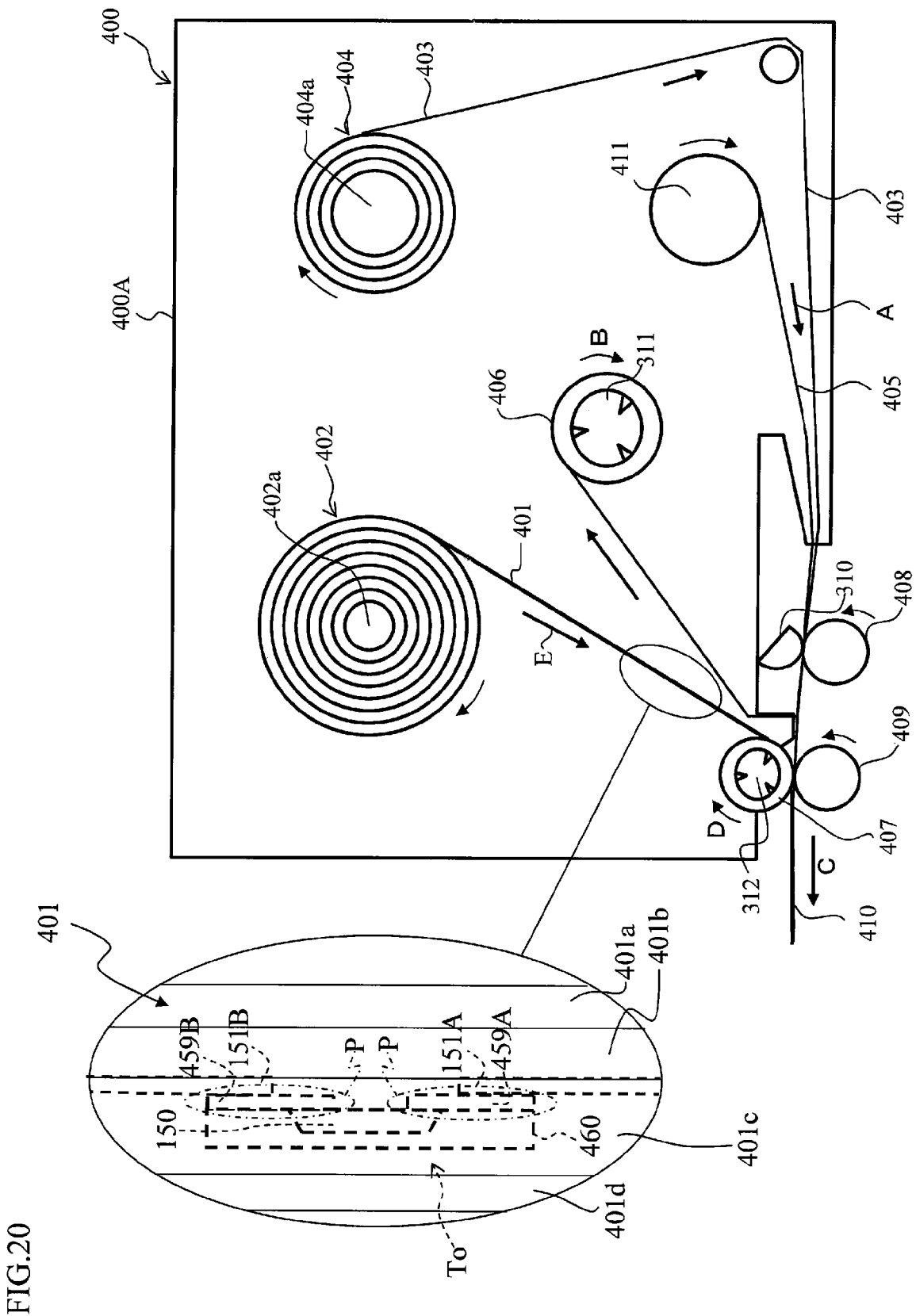
FIG. 20 is an explanatory diagram illustrating the detailed structure of the cartridge shown in FIG. 2.

FIG. 20 is an explanatory diagram illustrating the detailed structure of the cartridge 400.

In FIG. 20, the cartridge 400 has a housing 400A, a first roll (tag tape roll) 402 arranged inside the housing 400A and around which the above-mentioned base tape 401 (tag tape) having a band-like shape is wound, a second roll (print-receiving tape roll) 404 around which the transparent cover film 403 of substantially the same width as the base tape 401 is wound, a ribbon-supply-side roll 411 for paying out the ink ribbon 405 (thermal transfer ribbon; unnecessary when the cover film used is a thermal tape), a ribbon take-up roller 406 for taking up the ink ribbon 405 after printing, and a pressure roller 407 for pressing the base tape 401 and the cover film 403 and bonding them together into the tag label tape 410 with print and feeding the tag label tape 410 with print in the direction indicated by the arrow A.

The first roll 402 has the base tape 401 wound around a reel member 402a. The base tape 401 has the plurality of RFID circuit elements To sequentially formed at predetermined equal intervals in the longitudinal direction thereof.

The base tape 401 is of a four-layer structure in this example (see the partially enlarged view in FIG. 20). The base tape 401 is composed of a pressure-bonding adhesive layer (third layer) 401a made of a suitable adhesive material, a colored base film 401b made of PET (polyethylene terephthalate) or the like, a bonding adhesive layer (first layer) 401c made of a suitable adhesive material, and a separation sheet (second layer) 401b, which are laminated in the stated order from the side wound on the outer side (the right side in FIG. 20) toward the side opposite thereto (the left side in FIG. 20).

The above-mentioned antennas 151A, 151B for performing transmission/reception of information are provided integrally on the back side (the left side in FIG. 20) of the base film 401b, and the IC circuit part 150 for storing information is formed so as to be connected to the antennas 151A, 151B via communication terminals 459A, 459B. Further, a protective film 460 (IC protection film) is arranged so as to substantially cover the ends of the antennas 151A, 151B, the above-mentioned connection terminals 459A, 459B, and the above-mentioned IC circuit part 150. These components together constitute each RFID circuit element To.

The above-mentioned adhesive layer 401a for adhering the cover film 403 later is formed on the front side (the right side in FIG. 20) of the base film 401b. Also, on the back side (the left side in FIG. 20) of the base film 401b, the separation sheet 401d is adhered onto the base film 401b by means of the above-mentioned adhesive layer 401c provided so as to contain the RFID circuit element To. It should be noted that the separation sheet 401d is peeled off when affixing the finally completed RFID label T having a label-shaped configuration onto a predetermined item or the like, thus allowing adhesion of the RFID label T onto the item or the like by means of the adhesive layer 401c.

The second roll 404 has the above-mentioned cover film 403 wound around a reel member 404a. In the cover film 403 paid out from the second roll 404, the ribbon-supply-side roll 411 arranged on the back surface side (that is, the side where the cover film 403 is adhered onto the base tape 401) of the cover film 403, and the ink ribbon 405 driven by the ribbon take-up roller 406 are brought into abutment with the back surface of the cover film 403 as they are pressed by the print head 310.

The ribbon take-up roller 406 and the pressure roller 407 are rotated as the driving force of the motor 203 to drive cartridge shaft (see FIG. 19 described above) as a pulse motor, for example, provided outside the cartridge 400 is transmitted to the above-mentioned ribbon take-up roller drive shaft 311 and the above-mentioned pressure roller drive shaft 312, respectively.

In the cartridge 400 constructed as described above, the base tape 401 paid out from the first roll 402 is supplied to the pressure roller 407. On the other hand, in the cover film 403 paid out from the second roll 404, the ribbon-supply-side roll 411 arranged on the back surface side (that is, the side where the cover film 403 is adhered onto the base tape 401) of the cover film 403, and the ink ribbon 405 driven by the ribbon take-up roller 406 are pressed against the print head 310 to be brought into abutment with the back surface of the cover film 403.

When the cartridge 400 is loaded onto the cartridge holder part of the above-mentioned main body 308, and the roller holder (not shown) is moved from a separated position to an abutting position, the cover film 403 and the ink ribbon 405 are held between the print head 310 and a platen roller 408, and also the base tape 401 and the cover film 403 are held between the pressure roller 407 and a sub-roller 409. Then, due to the driving force of the motor 203 to drive cartridge shaft, the ribbon take-up roller 406 and the pressure roller 407 are rotated in synchronism with each other in the directions indicated by the arrows B and D, respectively. At this time, the pressure roller drive shaft 312, and the sub-roller 409 and the platen roller 408 are coupled together by gears (not shown). As the pressure roller drive shaft 312 is driven, the pressure roller 407, the sub-roller 409, and the platen roller 408 rotate, and the base tape 401 is paid out from the first roll 402 and supplied to the pressure roller 407 as described above. On the other hand, the cover film 403 is paid out from the second roll 404, and a plurality of heater elements of the print head 310 are energized by the print-head drive circuit 205. As a result, the print R (see FIG. 7 that will be described later) is printed on the back surface of the cover film 403. Then, the above-mentioned base tape 401 and the cover film 403 on which printing has been finished as described above are adhered and integrated together by means of the pressure roller 407 and the sub-roller 409, thus forming the tag label tape 410 with print, which is carried to the outside of the cartridge 400. It should be noted that the ink ribbon 405 for which printing on the cover film 403 has been finished is taken up on the ribbon take-up roller 406 due to the drive of the ribbon take-up roller drive shaft 311.

Here, as can be appreciated from the feeding flow of the base tape 401 mentioned above, the most prominent feature of this embodiment resides in that within the cartridge 400, the first roll 402 and the pressure roller 407 are arranged such that when the direction of the base tape 401 is deflected from the arrow E direction to the arrow C direction by the pressure roller 407, the IC circuit part 150 is located on the inner peripheral side (the left side in FIG. 20) with respect to the joining part between the IC circuit part 150 and the antennas 151A, 151B (such that the IC circuit part 150 is located on the inner peripheral side (the left side in FIG. 20) with respect to the antennas 151A, 151B). In this example, in particular, the first roll 402 itself is wound such that the IC circuit part 150 is located on the inner peripheral side (the left side in FIG. 20) with respect to the joining part (connection part) P (FIG. 20) between the IC circuit part 150 and the antennas 151A, 151B (such that the IC circuit part 150 is located on the inner peripheral side (the left side in FIG. 20) with respect to the antennas 151A, 151B). Further, the above-mentioned bonding adhesive layer 401c is located on the above-mentioned inner peripheral side with respect to the RFID circuit element To, and the separation sheet 401d is located on the further inner peripheral side with respect to the adhesive layer 401c. Further, the pressure-bonding adhesive layer 401a is located on the outer peripheral side (the right side in FIG. 20) with respect to the RFID circuit element To at the time of the above-mentioned deflection. That is, the first roll 402 has a structure in which the adhesive layer is located on the outer side and the separation sheet is located on the inner side.

The radio frequency circuit 201 is the same as that of the first embodiment shown in FIG. 4. That is, the radio frequency circuit 201 is composed of a transmitting portion 212 for transmitting a signal to the RFID circuit element To via the antenna 4, a receiving portion 212 for inputting a reflected wave from the RFID circuit element To received by the antenna 4, and a circulator 214.

The transmitting portion 212 includes a crystal oscillator 215A, a PLL (Phase Locked Loop) 215B, and a VOC (Voltage Controller Oscillator) 215C, which generate a carrier wave for making access to (performing reading from/writing to) the RFID tag information of the IC circuit part 150 of the RFID circuit element To, a first multiplying circuit 216 (in the case of amplitude modulation, a variable amplification factor amplifier or the like may be used) for performing modulation (in this example, amplitude modification based on a "TX_ASK" signal from the signal processing circuit 202) on the carrier wave generated on the basis of a signal supplied from the signal processing circuit 202, and a variable transmission amplifier 217 for performing amplification on the modulated wave modulated by the first multiplying circuit 216 while determining the amplification factor on the basis of a "TR_PWR" signal from the control circuit 210. The carrier wave generated as described above preferably uses a frequency in the UHF band, and the output of the transmission amplifier 217 is transmitted to the antenna 4 via the circulator 214 and supplied to the IC circuit part 150 of the RFID circuit element To.

The receiving portion 213 includes a first receiving signal multiplying circuit 218 for performing multiplication between the reflected wave from the RFID circuit element To received by the antenna 4 and the generated carrier wave mentioned above, a first band-pass filter 219 for extracting only a signal of the required band from the output of the first receiving signal multiplying circuit 218, a first receiving signal amplifier 221 for amplifying the output of the first band-pass filter 219 and supplying the resultant to a first limiter 220, a second receiving signal multiplying circuit 222 for performing multiplication between the reflected wave from the RFID circuit element To received by the antenna 4 and a carrier wave whose phase has been shifted by 90° after being generated as described above, a second band-pass filter 223 for extracting only a signal of the required band from the output of the second receiving signal multiplying circuit 222, and a second receiving signal amplifier 225 for inputting and amplifying the output of the second band-pass filter 223 and supplying the resultant to a second limiter 224. A signal "RXS_I" output from the first limiter 220, and a signal "RXS_Q" output from the second limiter 224 are input to the signal processing circuit 202 for processing.

Further, the outputs of the first receiving signal amplifier 222 and the second receiving signal amplifier 225 are also input to a RSSI (Received Signal Strength Indicator) circuit 226, and a signal "RSSI" indicating the strengths of these signals are input to the signal processing circuit 202. In this way, in the tag-label producing device 302 according to this embodiment, demodulation of the reflected wave from the RFID circuit element To is performed through IQ quadrature demodulation.

Figure 21:
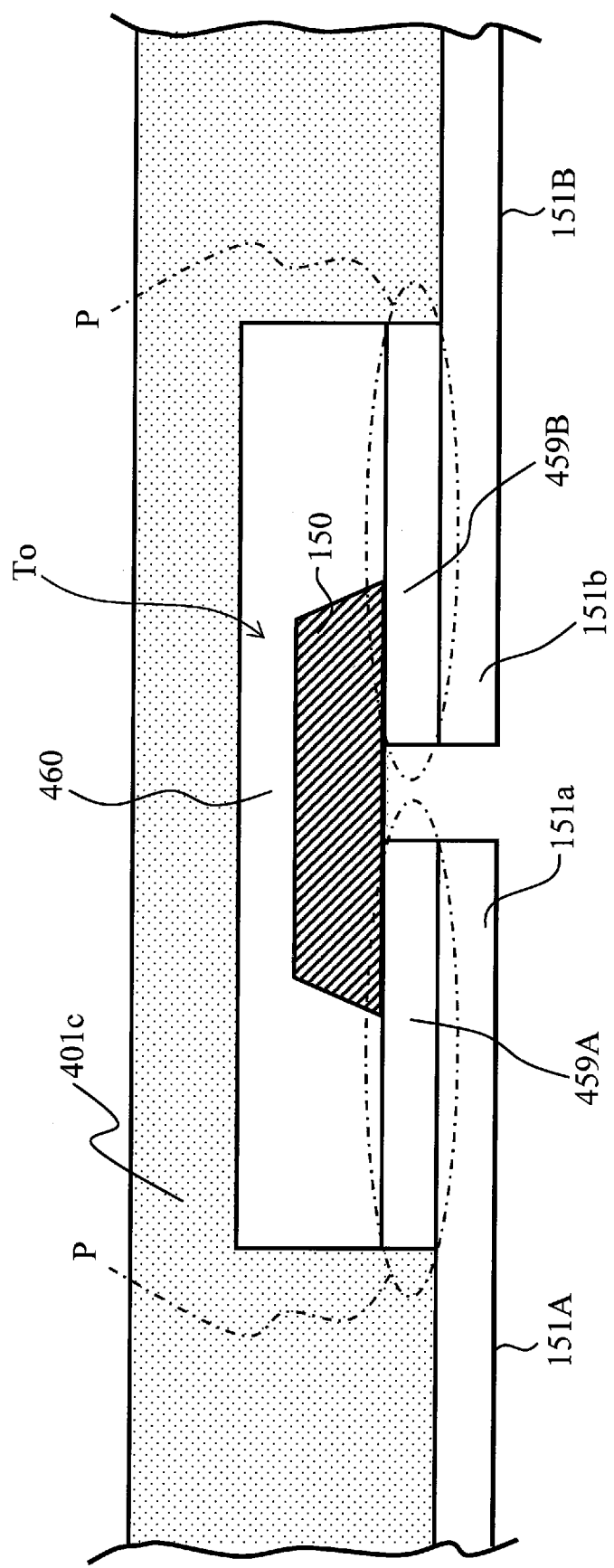
FIG. 21 is a sectional view obtained by further enlarging the partially enlarged view of FIG. 20, showing the detailed structure of the RFID circuit element.

FIG. 21 is a sectional view obtained by further enlarging the partially enlarged view of FIG. 20, showing the detailed structure of the RFID circuit element To equipped in the bonding adhesive layer 401c of the base tape 401 wound around the first roll 402.

In FIG. 21, the RFID circuit element To is composed of the two antennas 151A, 151B, which respectively have a plurality of connecting ends 151a, 151b provided on the side to be connected to the IC circuit part 150 and are adapted to perform transmission/reception of information, the IC circuit part 150 endowed with a rigidity larger than that of the antennas 151A, 151B, the connection terminals 459A, 459B provided in order to connect between the IC circuit part 150 and the two antennas 151A, 151B and endowed with a rigidity larger than that of the antennas 151A, 151B, and the protective film 460 disposed so as to substantially cover the IC circuit part 150, the connection terminals 459A, 459B, and the connecting ends 151a, 151b of the antennas 151A, 151B. As described above, the connecting ends 151a, 151b of the antennas 151A, 151B, the connection terminals 459A, 459B, and the IC circuit part 150 are substantially covered by the protective film 460 from above in FIG. 21.

The functional configuration of the RFID circuit element To is the same or equivalent to that of the first embodiment shown in FIG. 5. That is, the RFID circuit element To has the antenna 151 for performing transmission/reception of a signal to/from the antenna 4 on the tag-label producing device 302 side in a non-contact manner using a radio frequency in the UHF band or the like, and the IC circuit part 150 connected to the antenna 151.

The IC circuit part 150 includes a rectification part 152 for rectifying the carrier wave received by the antenna 151, a power source part 153 for storing the energy of the carrier wave rectified by the rectification part 152 to use the stored energy as a drive power source, a clock extraction part 154 for extracting a clock signal from the carrier wave received by the antenna 151 and supplying it to a control unit 152, a memory part 155 that functions as an information storage part capable of storing a predetermined information signal, a modem part 156 connected to the antenna 151, and the control unit 157 for controlling the actuation of the RFID circuit element To via the rectification part 152, the clock extraction part 154, the modem part 156, and the like.

The modem part 156 performs demodulation of a communication signal from the antenna 4 of the tag-label producing device 302 received by the antenna 151, and on the basis of a response signal from the control unit 157, modulates and reflects the carrier wave received by the antenna 151.

The control unit 157 executes a basic control such as interpreting the received signal demodulated by the modem part 156, generating a reply signal on the basis of an information signal stored in the memory part 155, and returning the reply signal by the modem part 156.

Figure 22:
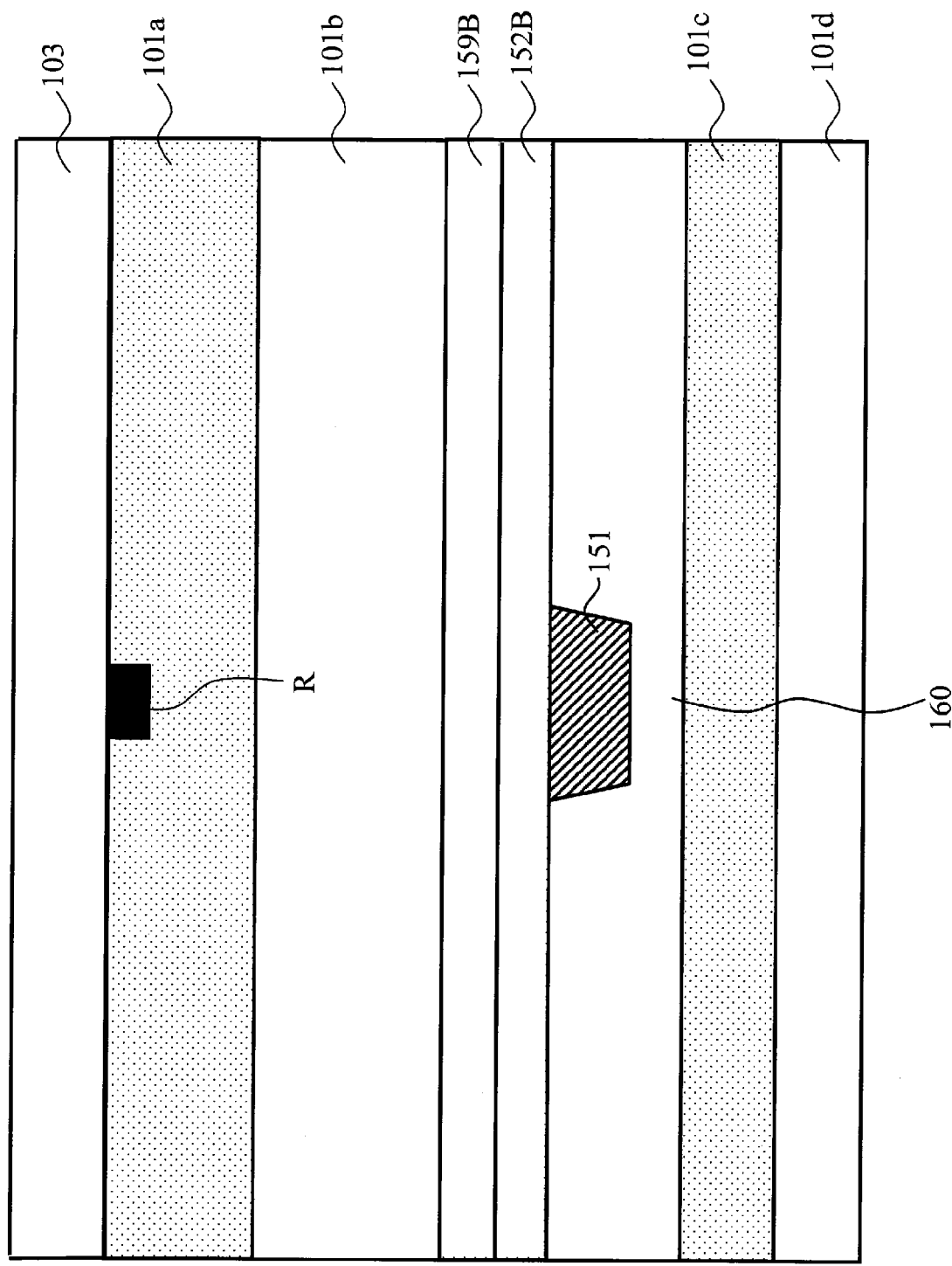
FIG. 22 is a transverse sectional view of the RFID label.

The outward appearance of the RFID label T formed after completing reading (or writing) of information from the RFID circuit element To and cutting of the tag label tape 410 with print is the same as that of the first embodiment shown in FIG. 6, and its sectional structure is as shown in FIG. 22. That is, the RFID label T is of a five-layer structure with the cover film 403 added to the four-layer structure shown in FIG. 20. The five layers consist of the cover film 403, the adhesive layer 401a, the base film 401b, the adhesive layer 401c, and the separation sheet 401d that are laminated in the stated order from the cover film 403 side (the upper side in FIG. 22) toward the side opposite thereto (the lower side in FIG. 22). Further, as described above, the RFID circuit element To including the antenna 151 provided on the back side of the base film 401b is equipped inside the adhesive layer 401c, and the print R (in this example, the character "RF-ID" indicating the kind of the RFID label T) is printed on the back surface of the cover film 403.

FIG. 23 is a diagram showing an example of the screen displayed on the terminal 305 or the general purpose computer 306 mentioned above when making access to (performing reading from or writing to) the RFID tag information of the IC circuit part 150 of the RFID circuit element To by the tag-label producing device 302 as described above.

In FIG. 23, in this example, the print character R printed in correspondence with the RFID circuit element To, an access (reading or writing) ID as an ID unique to that RFID circuit element To, the address of item information stored in the information server 307, and the storage destination addresses of those corresponding information in the route serer 304, and the like can be displayed on the terminal 305 or the general purpose computer 306. Through operation on the terminal 305 or the general purpose computer 305, the tag-label producing device 302 is activated and the print character R is printed onto the cover film 403, and also the RFID tag information such as the reading ID and item information previously stored in the IC circuit part 150 are read (or information such as the reading ID and item information is written into the IC circuit part 150).

While the foregoing description is directed to the example in which access is made to the tag label tape 410 with print that is being moved along the feeding guides 6 in accordance with the printing operation while retaining the tag label tape 410 with print within the access area, this should not be construed restrictively. The above-mentioned access may be made while stopping the tag label tape 410 with print at a predetermined position and retaining it by the feeding guides 6.

Further, at the time of performing reading and writing as described above, the correspondence between the ID of the generated RFID label T and information read from the IC circuit part 150 (or information written into the IC circuit part 150) of that RFID label T is stored in the router server 304 described above and can be referenced as required.

In the above-described arrangement, the pressure roller 407 constitutes feed deflection means as recited in the claims, for feeding the tag tape paid out from the tag tape roll while deflecting the direction of the tag tape.

In the tag-label producing device 302 according to this embodiment constructed as described above, access (reading of the RFID tag information of the IC circuit part 150 or writing to the IC circuit part 150) is sequentially performed with respect to the RFID circuit elements To taken out from the cartridge 400 as the tag label tape 410 with print and set and retained at a predetermined position (access area) opposed to the antenna 4 by the feeding guides 6, and the tag label tape 410 with print is cut by the cutter 5 for each individual RFID circuit element To thereby produce the RFID label T. The separation sheet 401d of the generated RFID label T is peeled off by the user to expose the adhesive layer 401c, and then the RFID label T is affixed onto various items through the adhesive layer 401c for use.

Figure 24:
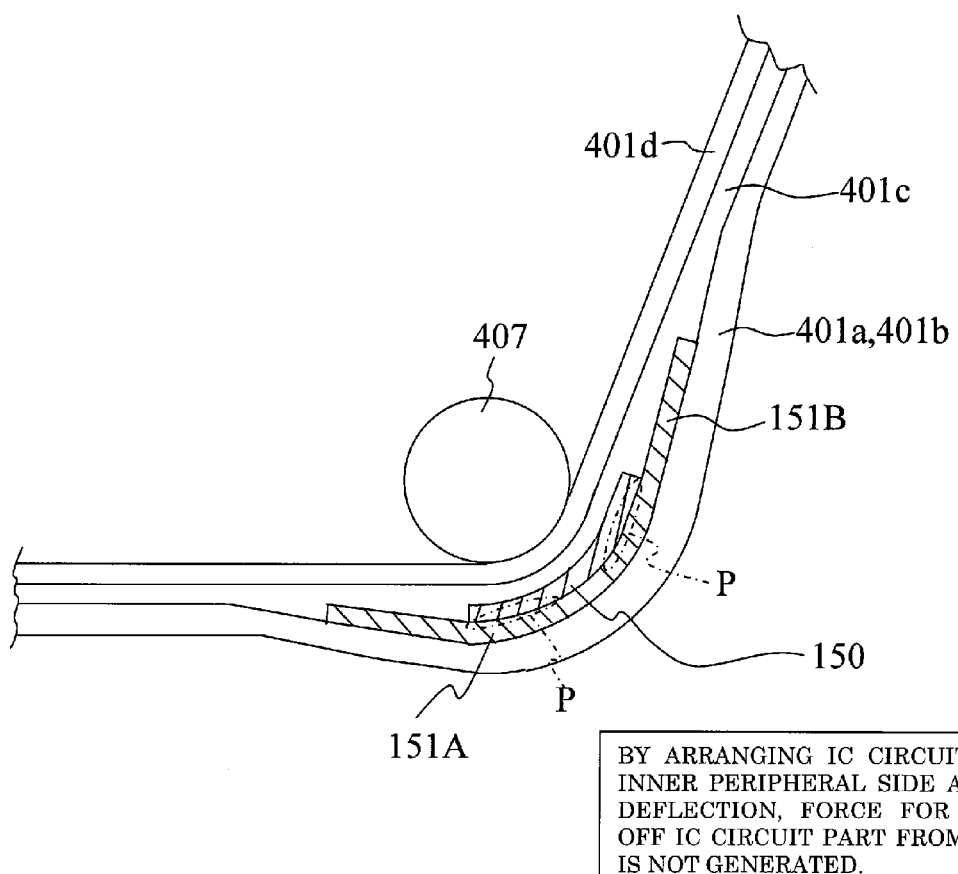
FIG. 24 is a view showing how deflection is effected by a pressure roller in a cartridge according to a second embodiment of the present invention.
Figure 25:
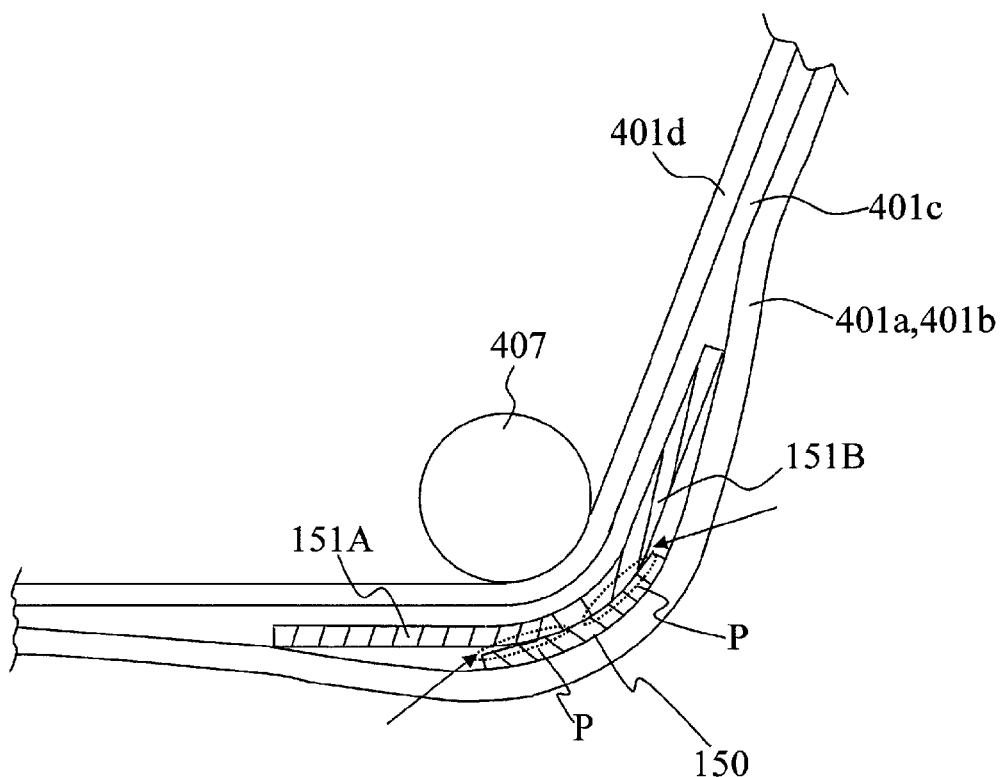
FIG. 25 is a view showing how deflection is effected by the pressure roller in a cartridge according to a comparative example.

In the cartridge 400 according to this embodiment, the first roll 402 and the pressure roller 407 are arranged such that when the base tape 401 paid out from the first roll 402 is deflected by the pressure roller 407, the IC circuit part 150 having a relatively small size and a large rigidity is located on the inner peripheral side (=safety area) and the antennas 151A, 151B having a relatively large size and a small rigidity are located on the outer peripheral side (in other words, such that the connection part P between the antennas 151A, 151B and the IC circuit part 150 is located on the outer peripheral side) (the conceptual illustration of this arrangement is shown in FIG. 24). As a result, it is possible to prevent a force acting to strip off the IC circuit part 150 from the antennas 151A, 151B from being generated at the time of deflection as in the case where, conversely, the IC circuit part 150 is located on the outer peripheral side and the antennas 151A, 151B are located on the inner peripheral side (in other words, the connection part P between the antennas 151A, 151B and the IC circuit part 150 is located on the inner peripheral side), whereby the soundness and reliability of the completed RFID label T product can be improved. Further, since the flexibility of the RFID circuit element To is improved as described above, the RFID circuit element To can readily conform to the configuration of the feed path at the time of deflecting the direction by the pressure roller 407, thereby also achieving the effect of improving the running property (reducing the running resistance).

Further, as shown in FIG. 20, in the first roll 402 as well, the base tape 401 is wound so that the IC circuit part 150 of a high rigidity is located on the inner peripheral side and the antennas 151A, 151B of a low rigidity are located on the outer peripheral side (in other words, the connection part P between the IC circuit part 150 and the antennas 151A, 151B is located on the outer peripheral side), whereby the RFID circuit element To can readily conform to a substantially arcuate configuration along the direction in which the base tape 401 is wound. As a result, the base tape 401 equipped with a large number of RFID circuit elements To can be wound relatively easily. Provided that the number of turns is the same, the size of the first roll 402 as a whole can be reduced, and the size of the cartridge 400 can be reduced due to the saved space. In addition, the interval between the turns can be made small. Further, provided that the diameter is the same, the number of turns to be wound can be increased to arrange a large number of RFID circuit elements To.

In this embodiment as well, the present invention is not limited to the above-described arrangement but various modifications may be made without departing from the scope and technical idea of the present invention. Such modifications will be described below.

(2-1) Case where Bonding is not Performed

This refers to a case where the present invention is applied to a tag-label producing device in which, instead of performing printing on the cover film 403 separate from the tag tape (base tape) 401 equipped with the RFID circuit element To and then bonding the cover film 403 and the tag tape 401 together, printing is performed on a cover film equipped to the tag tape.

Figure 26:
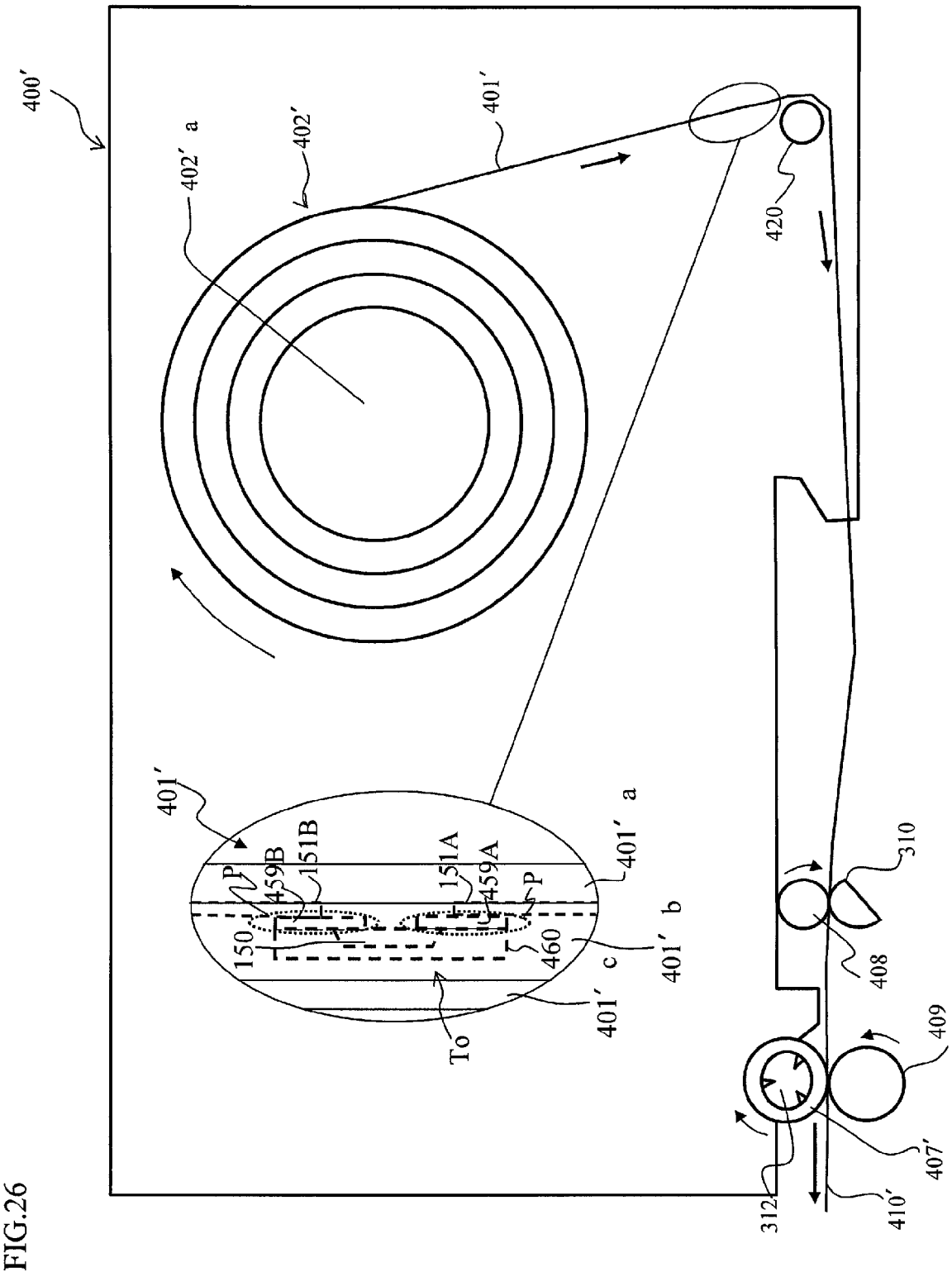
FIG. 26 is an explanatory diagram illustrating the detailed structure of a cartridge according to a modification in which no bonding is performed.

FIG. 26 is an explanatory diagram illustrating the detailed structure of a cartridge 400' according to this modification and corresponding to FIG. 20 described above. The portions that are the same as those of FIG. 20 are denoted by the same reference numerals, and description thereof will be omitted as appropriate.

In FIG. 26, the cartridge 400' has a first roll (thermal tape roll or tag tape roll) 402' around which a thermal tape 401' (tag tape) is wound, a tape feed roller 407 for feeding the thermal tape 401' toward the outside of the cartridge 400', and a feed deflection roll 420 for feeding the thermal tape 401' while largely deflecting the feeding direction of the thermal tape 401'.

In the first roll 402', the band-like, transparent thermal tape 401' having the plurality of RFID circuit elements To sequentially formed in the longitudinal direction thereof is wound around a reel member 402'a.

The thermal tape 401' wound around the first roll 402' is of a three-layer structure in this example (see the partially enlarged view in FIG. 26). The thermal tape 401' is composed of a cover film 401'a made of PET (polyethylene terephthalate) or the like, a bonding adhesive layer (first layer) 401'b made of a suitable adhesive material, and a separation sheet (second layer) 101'c, which are laminated in the stated order from the side wound on the outer side (the right side in FIG. 26) toward the side opposite thereto (the left side in FIG. 26)

The above-mentioned antennas 151A, 151B for performing transmission/reception of information are provided integrally on the back side (the left side in FIG. 26) of the cover film 401'a, and the IC circuit part 150 for storing information is formed so as to be connected to the antennas 151A, 151B via the communication terminals 459A, 459B. Further, the protective film 460 (IC protection film) is arranged so as to substantially cover the ends of the antennas 151A, 151B, the above-mentioned connection terminals 459A, 459B, and the above-mentioned IC circuit part 150. These components together constitute each RFID circuit element To.

On the back side (the left side in FIG. 26) of the cover film 401'a, the separation sheet 401'c is adhered onto the cover film 401'a through the adhesive layer 401'b provided so as to contain the RFID circuit element To. It should be noted that the separation sheet 401'c is peeled off when affixing the finally completed RFID label T having a label-shaped configuration onto a predetermined item or the like, thus allowing adhesion of the RFID label T onto the item or the like by means of the adhesive layer 401'b.

When the cartridge 400' is loaded onto the cartridge holder part of the tag-label producing device 302, and the roller holder (not shown) is moved from a separated position to an abutting position, the thermal tape 401' is held between the print head 310 and a platen roller 408, and also between the tape feed roller 407' and a sub-roller 409. Then, as a pressure roller drive shaft 312 is driven by the driving force of the motor 203 to drive cartridge shaft (see FIG. 19), the tape feed roller 407', the sub-roller 409, and the platen roller 408 are rotated in synchronism with each other, and the thermal tape 401' is paid out from the first roll 402' and largely deflected in direction by the feed deflection roll 420 before being supplied to the print head 310 side.

The plurality of the heater elements of the print head 310 are energized by the print-head drive circuit 205 (see FIG. 19), and a print is thus printed on the front surface of the cover film 401'a of the thermal tape 401' to form a tag label tape 410' with print, which is then carried to the outside of the cartridge 400'. It is needless to mention that the print may be a print using an ink ribbon as in the above-described embodiment.

Since the process after the carrying of the tag label tape 410 with print' to the outside of the cartridge 400', including access (reading/writing of information) to the RFID tag information via the antenna 4, the feeding by the feeding roller 7, the cutting using the cutter 5, and so on is the same as that in the above-described embodiment, description thereof will be omitted.

In the above-described arrangement, the feed deflection roll 420 constitutes a first feeding roll for, while deflecting the direction of the tag tape paid out from the tag tape roll, guiding the tag tape to the print head for performing predetermined printing on the surface located on the outer peripheral side of the tag tape at the time of direction deflection, and also constitutes feed deflection means.

The cartridge 400' according to this modification provides substantially the same effect as that of the above-mentioned second embodiment.

That is, the first roll 402' and the feed deflection roll 420 are arranged such that when the direction of the thermal tape 401' paid out from the first roll 402' is deflected by the feed deflection roll 420, the IC circuit part 150 is located on the inner peripheral side (=safety area) and the antennas 151A, 151B are located on the outer peripheral side (in other words, such that the connection part P between the IC circuit part 150 and the antennas 151A, 151B is located on the outer peripheral side). Accordingly, it is possible to prevent a force acting to strip off the IC circuit part 150 from the antennas 151A, 151B from being generated at the time of deflection, whereby the soundness and reliability of the completed RFID label T product can be improved, and also the running property at the time of direction deflection by the feed deflection roll 420 can be improved (running resistance can be reduced). Further, the size of the first roll 402' can be reduced, thereby achieving the same effect as that described above.

Figure 27:
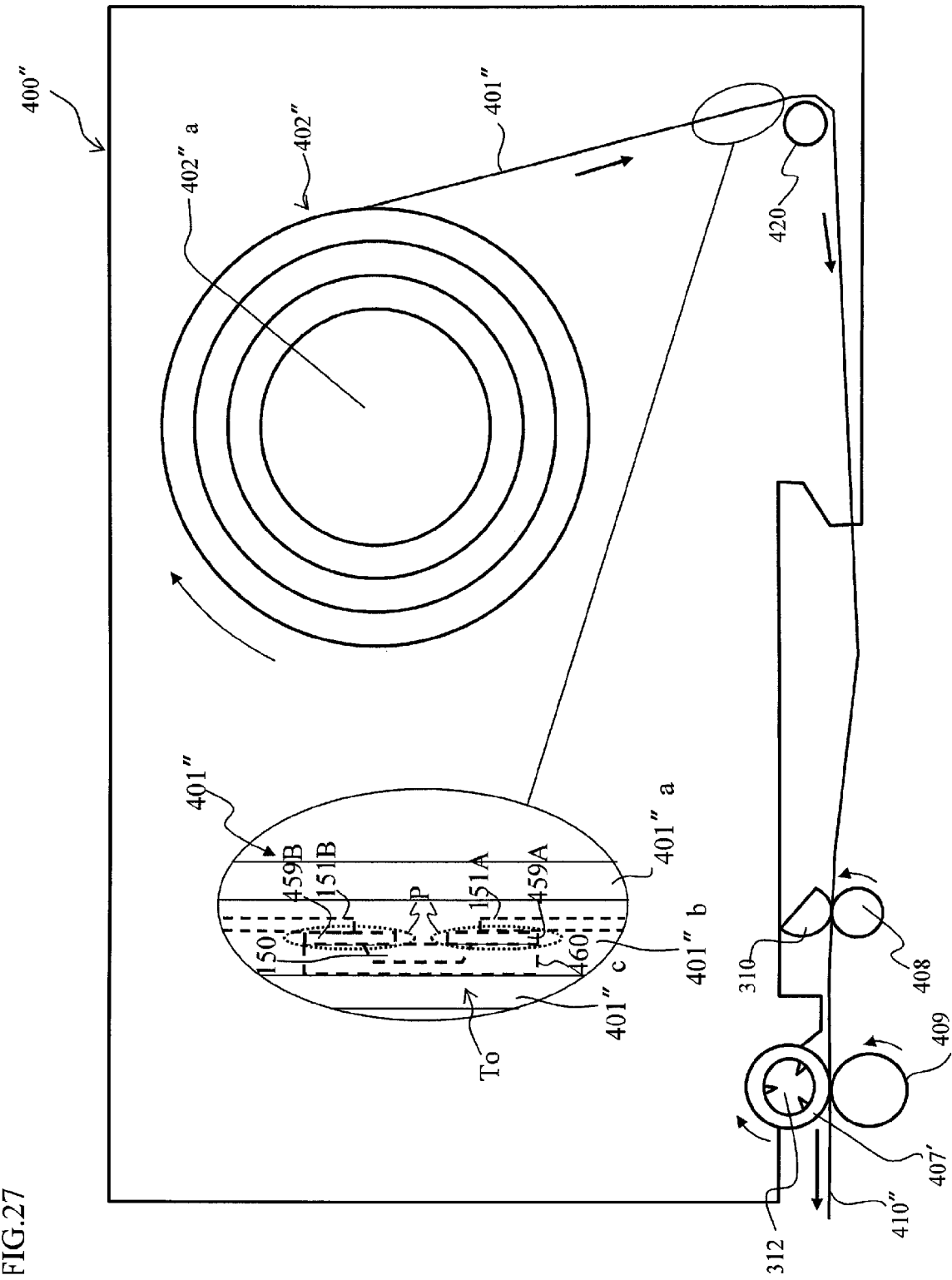
FIG. 27 is an explanatory diagram illustrating the detailed structure of a cartridge according to another modification in which no bonding is performed.

While in the forgoing description printing is performed by bringing the print head 310 into contact with the cover film 401' from the outside of the cartridge, this should not be construed restrictively; printing may be performed from the inside of the cartridge as in the above-described embodiment (however, the print is not a mirror character as described later). FIG. 27 is an explanatory diagram illustrating the detailed structure of a cartridge 400" according to such a modification and corresponds to FIG. 26 mentioned above. The portions that are the same as those of FIGS. 20 and 26 are denoted by the same reference numerals, and description thereof will be omitted as appropriate.

In FIG. 27, the cartridge 400' has a first roll (thermal tape roll or tag tape roll) 102" around which a thermal tape 401" (tag tape) is wound, a tape feed roller 407' for feeding the thermal tape 401" toward the outside of the cartridge 400", and a feed deflection roll 420 for feeding the thermal tape 401" while largely deflecting the feeding direction of the thermal tape 401".

In the first roll 402", the band-like, transparent thermal tape 401" having the plurality of RFID circuit elements To sequentially formed in the longitudinal direction thereof is wound around a reel member 402"a.

The thermal tape 401" wound around the first roll 402' is of a three-layer structure in this example (see the partially enlarged view in FIG. 27). The thermal tape 401" is composed of a separation sheet (fifth layer) 401"a, a bonding adhesive layer (fourth layer) 401"b made of a suitable adhesive material, and a cover film 401'c made of PET (polyethylene terephthalate) or the like, which are laminated in the stated order from the side wound on the outer side (the right side in FIG. 27) toward the side opposite thereto (the left side in FIG. 27).

The IC circuit part 150 is provided integrally on the back side (the right side in FIG. 27) of the cover film 401'c, and the antennas 151A, 151B for performing transmission/reception of information are formed so as to be connected to the IC circuit part 150 via the communication terminals 459A, 459B. Further, the protective film 460 (IC protection film) is arranged so as to substantially cover the ends of the antennas 151A, 151B, the connection terminals 459A, 459B, and the IC circuit part 150. These components together constitute each RFID circuit element To.

On the back side (the right side in FIG. 27) of the cover film 401"c, the separation sheet 401"a is adhered onto the cover film 401"c through the adhesive layer 401"b provided so as to contain the RFID circuit element To. It should be noted that the separation sheet 401"a is peeled off when affixing the finally completed RFID label T having a label-shaped configuration onto a predetermined item or the like, thus allowing adhesion of the RFID label T onto the item or the like by means of the adhesive layer 401"b.

When the cartridge 400" is loaded onto the cartridge holder part of the tag-label producing device 302, and the roller holder (not shown) is moved from a separated position to an abutting position, the thermal tape 401" is held between the print head 310 and a platen roller 408, and also between the tape feed roller 407' and a sub-roller 409. Then, as a pressure roller drive shaft 312 is driven by the driving force of the motor 203 to drive cartridge shaft (see FIG. 19), the tape feed roller 407', the sub-roller 409, and the platen roller 408 are rotated in synchronism with each other, and the thermal tape 401" is paid out from the first roll 402" and largely deflected in direction by the feed deflection roll 420 before being supplied to the print head 310 side.

The plurality of the heater elements of the print head 310 are energized by the print-head drive circuit 205 (see FIG. 19), and a print is thus printed on the front surface of the cover film 401"c of the thermal tape 401" to form a tag label tape 410" with print, which is then carried to the outside of the cartridge 400". It is needless to mention that the print may be a print using an ink ribbon as in the above-described embodiment.

Since the process after the carrying of the tag label tape 410" with print to the outside of the cartridge 400", including access (reading/writing of information) to the RFID tag information via the antenna 4, the feeding by the feeding roller 7, the cutting using the cutter 5, and so on is the same as that in the above-described embodiment, description thereof will be omitted.

In the above-described arrangement, the feed deflection roll 420 constitutes a second feeding roll for, while deflecting the direction of the tag tape paid out from the tag tape roll, guiding the tag tape to the print head for performing predetermined printing on the surface located on the inner peripheral side of the tag tape at the time of the direction deflection, and also constitutes feed deflection means.

The cartridge 400" according to this modification shown in FIG. 27 provides substantially the same effect as those of the above-mentioned second embodiment and the modification shown in FIG. 26.

That is, the first roll 402" and the feed deflection roll 420 are arranged such that when the direction of the thermal tape 401" paid out from the first roll 402" is deflected by the feed deflection roll 420, the IC circuit part 150 is located on the inner peripheral side (=safety area) and the antennas 151A, 151B are located on the outer peripheral side (in other words, such that the connection part P between the IC circuit part 150 and the antennas 151A, 151B is located on the outer peripheral side). Accordingly, it is possible to prevent a force acting to strip off the IC circuit part 150 from the antennas 151A, 151B from being generated at the time of deflection, whereby the soundness and reliability of the completed RFID label T product can be improved, and also the running property at the time of direction deflection by the feed deflection roll 420 can be improved (running resistance can be reduced). Further, the size of the first roll 402" can be reduced, thereby achieving the same effect as that described above.

(2-2) Case where Variable-Length Label is Produced by Tag Insertion

According to this modification, instead of arranging the RFID circuit elements To at a predetermined internal on the base tape and producing a fixed-length tag label T using the RFID circuit elements To as in the above-described embodiment and the modifications shown in FIGS. 26 and 27, a variable-length RFID label T corresponding to the print character length is produced by inserting the RFID circuit elements To at a predetermined timing between the base tape and the cover film that are to be bonded together. The portions that are the same as those of the above-described embodiment and the modifications are denoted by the same reference numerals, and description thereof will be omitted as appropriate.

Figure 28:
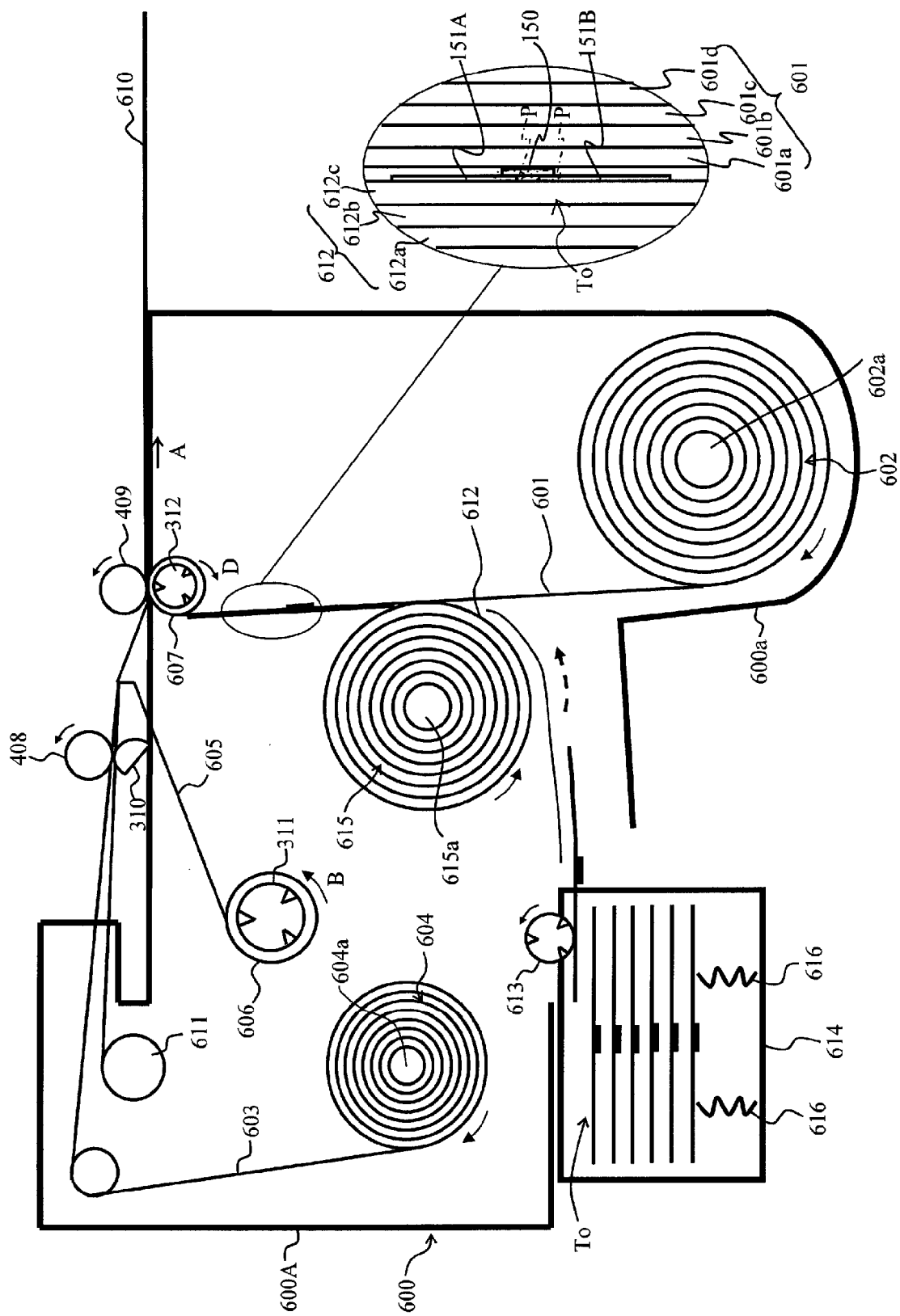
FIG. 28 is an explanatory diagram illustrating the detailed structure of a cartridge and its vicinity according to a modification in which a movable-length label is produced by tag insertion.

FIG. 28 is an explanatory diagram illustrating the detailed structure of a cartridge 600 and its vicinity according to this modification.

In FIG. 28, the cartridge 600 has a housing 600A, a first roll (tag tape roll) 602 arranged inside the housing 600A and around which a band-like base tape (tape for producing a tag tape) 601 similar to the base tape (or thermal tape) 401, 401', 401" is wound, a second roll (print-receiving tape roll) 604 around which, like the cover film 403, a transparent cover film 603 (print-receiving tape) of substantially the same width as the base tape 601 is wound, a third roll 615 around which an intermediate tape 612 made of, for example, a white material is wound, a ribbon-supply-side roll 611 for paying out an ink ribbon 605 (thermal transfer ribbon; unnecessary when the cover film used is a thermal tape) similar to the ink ribbon 405, a ribbon take-up roller 606 for taking up the ink ribbon 605 on which printing has been performed, and a pressure roller 607 (feed deflection means) similar to the pressure roller 407, for bonding the base tape 601 and the intermediate tape 612, between which the RFID circuit element To is inserted, and the cover film 603 together, and pressing and adhering them together to form a tag label tape 610 with print, and feeding the tag label tape 610 with print in the direction indicated by the arrow A.

The first roll 602 has the base tape 601 wound around a reel member 602a, the second roll 604 has the cover film 603 wound around a reel member 604a, and the third roll 615 has the intermediate tape 612 wound around a reel member 615a.

The base tape 601 is of a four-layer structure in this example, and the intermediate tape 612 arranged across the RFID circuit element To is of a three-layer structure in this example (see the partially enlarged view in FIG. 28).

That is, the base tape 601 is composed of a pressure-bonding adhesive layer (third layer) 601a made of a suitable adhesive material, a colored base film 601b made of PET (polyethylene terephthalate) or the like, a bonding adhesive layer (first layer) 601c with a suitable adhesive material added, and a separation sheet (second layer) 601b, which are laminated in the stated order from the side wound on the outer side (the left side in FIG. 28) toward the side opposite thereto (the right side in FIG. 28).

The intermediate tape 612 is of a three-layer structure in this example. The base tape 612 is composed of an adhesive layer 612a made of a suitable adhesive material, a film 612b of, for example, a white color made of PET (polyethylene terephthalate) or the like, and an adhesive layer 612c with a suitable adhesive material added, which are laminated in the stated order from the side wound on the inner side (the left side in FIG. 28) toward the side opposite thereto (the right side in FIG. 28).

At this time, the adhesive layer 601a of the base tape 601 and the adhesive layer 612c of the intermediate tape 612 serve to retain the RFID circuit element To therebetween. It should be noted that the adhesive layer 612c may be omitted as appropriate provided that the insertion and retention of the RFID circuit element To can be ensured. Further, the separation sheet 601d of the base tape 601 is adhered onto the back side (the right side in FIG. 28) of the base film 601b through the adhesive layer 601c, and is peeled off when affixing the finally completed RFID label T having a label-shaped configuration onto a predetermined item or the like, thus allowing adhesion of the RFID label T onto the item or the like by means of the adhesive layer 601c.

As described above, each RFID circuit element To is composed of the antenna 151 for performing transmission/reception of information, and the IC circuit part 150 that is connected to the antenna 151 and stores information. Further, in this example, the RFID circuit elements To are stacked flat within a tag cartridge 614 while being pressed and urged toward the exit side by springs 616, and are extracted to the outside of the cartridge 614 one by one by an insertion drive shaft 613 (or this may be suitable roller means or the like fixed to the insertion drive shaft 613). Then, the RFID circuit elements To are sequentially inserted and held between the adhesive layer 601a of the base tape 601 and the adhesive layer 612c of the intermediate tape 612.

As a result, there is formed a laminate structure in which the plurality of RFID circuit elements To are sequentially arranged and contained between the adhesive layer 601a of the base tape and the adhesive layer 612c of the intermediate tape at equal predetermined intervals in the longitudinal direction of the tape.

On the other hand, with respect to the cover film 603 paid out from the second roll 604, the ink ribbon 605 is brought into contact with the back surface of the cover film 603 as the ribbon-supply-side roll 611 arranged on the back side (that is, the side to be adhered onto the base tape 601) thereof and the ink ribbon 605 that is driven by the ribbon take-up roller 606 are pressed against the print head 310. Further, the ribbon take-up roller 606 and the pressure roller 607 are rotated as the driving force of the motor 203 to drive cartridge shaft (see FIG. 19 described above) as a pulse motor, for example, provided outside the cartridge 600 is transmitted to the ribbon take-up roller drive shaft 311 and the pressure roller drive shaft 312, respectively.

In the cartridge 600 constructed as described above, the RFID circuit elements To discharged from the tag cartridge 614 are successively inserted between the base tape 601 paid out from the first roll 602 and the intermediate tape 612 paid out from the third roll 615, and supplied to the pressure roller 607 in that state (hereinafter, referred to as a tag-incorporating tape member 601, 612 as appropriate). On the other hand, as described above, the cover film 603 paid out from the second roll 604 is pressed by the print head 310 so that the back surface side of the cover film 603 is brought into contact with the ink ribbon 605. When the cartridge 600 is loaded onto the cartridge holder part of main body 308, and the roller holder (not shown) is moved from a separated position to an abutting position, the cover film 603 and the ink ribbon 605 are held between the print head 310 and a platen roller 408, and also the tag-incorporating tape member 601, 612 is held between the pressure roller 407 and a sub-roller 409. Then, due to the driving force of the motor 203 to drive cartridge shaft, the ribbon take-up roller 606 and the pressure roller 607 are rotated in synchronism with each other in the directions indicated by the arrows B and D, respectively. At this time, the pressure roller drive shaft 312, and the sub-roller 409 and the platen roller 408 are coupled together by gears (not shown). As the pressure roller drive shaft 312 is driven, the pressure roller 607, the sub-roller 409, and the platen roller 408 rotate, and the base tape 601 and the intermediate tape 612 are paid out from the first roll 602 and the third roll 615, respectively, and supplied to the pressure roller 607 as the tag-incorporating tape member 601, 612 as described above. On the other hand, the cover film 603 is paid out from the second roll 604, and a plurality of heater elements of the print head 310 are energized by the print-head drive circuit 205. As a result, a predetermined print R is printed on the back surface of the cover film 603. Then, the tag-incorporating tape member 601, 612 and the cover film 603 on which printing has been finished as described above are adhered and integrated together by means of the pressure roller 607 and the sub-roller 409, thus forming the tag label tape 610 with print, which is then carried to the outside of the cartridge 600. It should be noted that the ink ribbon 605 for which printing on the cover film 603 has been finished is taken up on the ribbon take-up roller 606 due to the drive of the ribbon take-up roller drive shaft 311.

The cartridge 600 according to this modification also provides substantially the same effect as that of the above-described embodiment.

That is, the first roll 602, the intermediate roll 615, the tag cartridge 614, and the pressure roller 607 are arranged such that when the RFID circuit elements To are inserted between the base tape 601 paid out from the first roll 602 and the intermediate tape 612 paid out from the intermediate roll 615 and supplied to the pressure roller 607 as the tag-incorporated tape member 601, 612 and deflected in direction by the pressure roller 607, the IC circuit part 150 is located on the inner peripheral side (=safety area) and the antennas 151A, 151B are located on the outer peripheral side (in other words, such that the connection part P between the IC circuit part 150 and the antennas 151A, 151B is located on the outer peripheral side). As a result, it is possible to prevent a force acting to strip off the IC circuit part 150 from the antennas 151A, 151B from being generated at the time of deflection, whereby the soundness and reliability of the completed RFID label T product can be improved, and also the running property at the time of direction deflection by the pressure roller 607 can be improved (running resistance can be reduced). Further, the size of the first roll 602 can be reduced, thereby providing the same effect as that described above.

Figure 29:
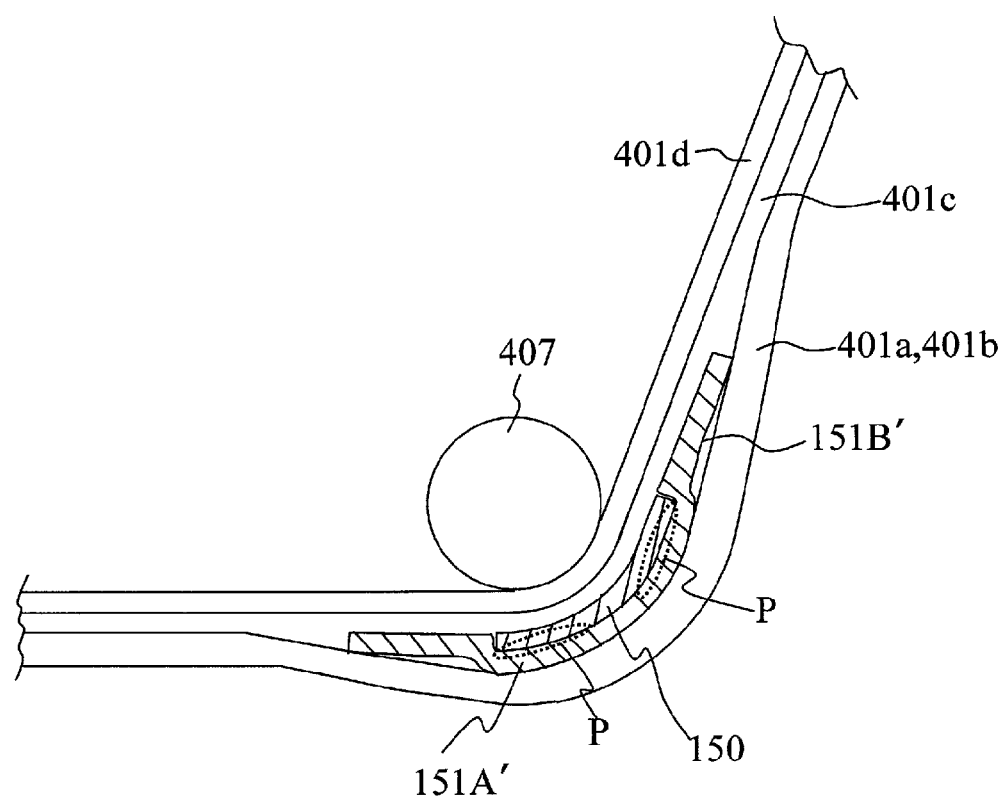
FIG. 29 is a conceptual diagram showing a modification in which the antenna is located not only on the outer peripheral side of the IC circuit part but is also located outward of the edge of the IC circuit part so as to cover the IC circuit part.

While the foregoing description is directed to the example in which, as shown in, for example, FIG. 24 or the like, the IC circuit part 150 and the antennas 151A, 151B are arranged in a generally layered fashion on the inner peripheral side and the outer peripheral side, respectively, this should not be construed restrictively. That is, as shown in FIG. 29 corresponding to FIG. 24, antennas 151A', 151B' may be located not only on the outer peripheral side of the IC circuit part 150 but may also be located outward of the edges of the IC circuit part 150 so as to cover the IC circuit part 150. The same effect as that described above can be attained in this case as well because the connection part (joining part) P between the IC circuit part 150 and the antennas 151A', 151B' is located on the outer peripheral side with respect to the IC circuit part 150.

It is assumed that the "Scroll All ID" signal, the "Erase" signal, the "Verify" signal, and the "Program" signal used in the foregoing description conform to the specifications developed by EPC global. EPC global is a non-profit corporation jointly founded by the international EAN association, which is an international association of distribution codes, and the Uniformed Code Council (UCC), which is a distribution code association of the United States. It should be noted that signals that conform to other standards may be used as long as they serve the same function.

Although not exemplified herein, it is to be understood that the present invention is implemented in various modified forms without departing from the scope of the present invention.

The present invention is not confined to the configuration listed in the foregoing embodiments, but it is easily understood that the person skilled in the art can modify such configurations into various other modes, within the scope of the present invention described in the claims.

The entire disclosures of Japanese Patent Applications No. 2004-116676 filed on Apr. 12, 2004 and Japanese Patent Applications No. 2004-158543 filed on May 28, 2004 including the specification, claims, drawings and summary are incorporated herein by reference in its entirety.

What is claimed is:

1. A tag-label producing device comprising:
a cartridge holder configured to receive one of an ordinary cartridge and an RFID tag cartridge,
wherein the ordinary cartridge comprises a roll comprising an ordinary tape having a print area extending along a tape width direction,
wherein the RFID tag cartridge comprises a roll comprising a tag tape having a size in the tape width direction greater than a size of the ordinary tape, a print area, and a region in which RFID circuit elements are positioned,
wherein the print area of the tag tape has a size in the tape width direction that is substantially equal to a size of the print area of the ordinary tape, and
wherein each of the RFID circuit elements is positioned on one side of the tag tape opposite from the print area in the tape width direction and comprises an IC circuit part for storing information and a tag antenna connected to said IC circuit part;
a device antenna configured to perform information transmission and information reception with respect to the IC circuit part of the RFID circuit elements via radio communication;
a feed drive shaft configured to feed out said tag tape from the roll of the tag tape when the RFID tag cartridge is mounted on the cartridge holder and configured to feed out said ordinary tape from the roll of the ordinary tape when the ordinary cartridge is mounted on the cartridge holder;
a thermal head configured to perform a printing process on one of the tag tape and the ordinary tape fed by the feed drive shaft, the thermal head having a size in the tape width direction substantially equal to the size of the ordinary tape and comprising a plurality of heater elements configured to be heated when energized;
a thermal-head drive circuit configured to control an energized area of the print head so that an area of the thermal head in the tape width direction is energized, the thermal head being arranged so that a center thereof in the tape width direction is aligned with one of a center of the print area of the ordinary tape in the tape width direction and a center of the print area of the tag tape in the tape width direction, wherein each of said RFID tag cartridge and said ordinary cartridge comprises a cartridge positioning part configured to perform positioning of the cartridge when the cartridge is mounted on the cartridge holder, wherein said cartridge holder comprises a positioning support part configured to perform positioning and to support the tag cartridge in coordination with the cartridge positioning part when the tag cartridge is mounted so that the region in which the RFID circuit elements of the tag tape fed from the RFID tag cartridge are positioned is on the one side in the tape width direction offset toward an outward side of the thermal head as well as from a center of the print area in the tape width direction, such that a region other than the region in which the RFID circuit elements are positioned is aligned with a center of the thermal head in the tape width direction, and wherein said cartridge holder is further configured to perform positioning and support the ordinary cartridge in coordination with the cartridge positioning part when the ordinary cartridge is mounted so that a center of the print area of the ordinary tape fed from the ordinary cartridge extending along the tape width direction is aligned with the center of the thermal head in the tape width direction.

* * * * *